United States Patent
Nozawa et al.

(10) Patent No.: US 9,894,270 B2
(45) Date of Patent: Feb. 13, 2018

(54) IMAGE PROCESSING APPARATUS AND IMAGE PROCESSING METHOD FOR HANDLING A RAW IMAGE, OF A MOVING IMAGE OR A STILL IMAGE

(71) Applicant: CANON KABUSHIKI KAISHA, Tokyo (JP)

(72) Inventors: Shingo Nozawa, Tokyo (JP); Masamichi Ito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/776,587

(22) PCT Filed: Mar. 6, 2014

(86) PCT No.: PCT/JP2014/001234
§ 371 (c)(1),
(2) Date: Sep. 14, 2015

(87) PCT Pub. No.: WO2014/141638
PCT Pub. Date: Sep. 18, 2014

(65) Prior Publication Data
US 2016/0037122 A1  Feb. 4, 2016

(30) Foreign Application Priority Data

Mar. 15, 2013 (JP) .................. 2013-053244
Mar. 15, 2013 (JP) .................. 2013-053245

(51) Int. Cl.
*H04N 5/232* (2006.01)
*H04N 9/04* (2006.01)
(Continued)

(52) U.S. Cl.
CPC ..... *H04N 5/23229* (2013.01); *H04N 5/23293* (2013.01); *H04N 5/772* (2013.01);
(Continued)

(58) Field of Classification Search
None
See application file for complete search history.

(56) References Cited

U.S. PATENT DOCUMENTS

2006/0221199 A1  10/2006  Nakajima
2006/0274190 A1* 12/2006  Kalevo .............. H04N 1/00307
                                                          348/345
(Continued)

FOREIGN PATENT DOCUMENTS

CN       101888478 A    11/2010
JP       2006-101389     4/2006
(Continued)

*Primary Examiner* — Justin P Misleh
(74) *Attorney, Agent, or Firm* — Canon U.S.A., Inc. IP Division

(57) ABSTRACT

An image processing apparatus is configured to capture an object image, generate a RAW image, perform simple development on the RAW image during the image capturing operation, and store not only the developed image but also the RAW image. In a predetermined interval, in an idle state, or in predetermined enlargement processing, the image processing apparatus reads a RAW file stored in a storage medium and performs high-quality image development to generate an image having higher image quality than that obtained by the simple development. If development processing has been completed by a high-quality image development unit, the image processing apparatus replaces the image obtained by the simple development with the image obtained by the high-quality image development and reproduces the image obtained by the high-quality image development.

17 Claims, 14 Drawing Sheets

(51) Int. Cl.
  *H04N 5/77* (2006.01)
  *H04N 9/804* (2006.01)
  *H04N 9/82* (2006.01)

(52) U.S. Cl.
  CPC .......... *H04N 9/045* (2013.01); *H04N 9/8042* (2013.01); *H04N 9/8205* (2013.01)

(56) References Cited

U.S. PATENT DOCUMENTS

| | | | |
|---|---|---|---|
| 2009/0154551 A1* | 6/2009 | Tauchi | H04N 5/772 375/240.01 |
| 2010/0295966 A1 | 11/2010 | Furlan | |
| 2011/0169987 A1* | 7/2011 | Gann | H04N 5/232 348/246 |
| 2013/0021505 A1* | 1/2013 | Plowman | H04N 5/357 348/241 |
| 2016/0037014 A1* | 2/2016 | Nozawa | H04N 9/045 386/224 |

FOREIGN PATENT DOCUMENTS

| | | |
|---|---|---|
| JP | 2006-166250 | 6/2006 |
| JP | 2006-229474 | 8/2006 |
| JP | 2007-104220 | 4/2007 |
| JP | 2009-147743 | 7/2009 |
| JP | 2009-225344 | 10/2009 |
| JP | 2009-225344 A | 10/2009 |
| JP | 2009225344 A * | 10/2009 |
| JP | 2010-004285 | 1/2010 |
| JP | 2010-081025 | 4/2010 |
| JP | 2010-081025 A | 4/2010 |
| JP | 2010081025 A * | 4/2010 |
| JP | 2011-244423 | 12/2011 |
| JP | 2012-010190 | 1/2012 |
| JP | 2012-234425 | 11/2012 |
| JP | 2012-234425 A | 11/2012 |
| JP | 2012234425 A * | 11/2012 |

* cited by examiner

[Fig. 1]
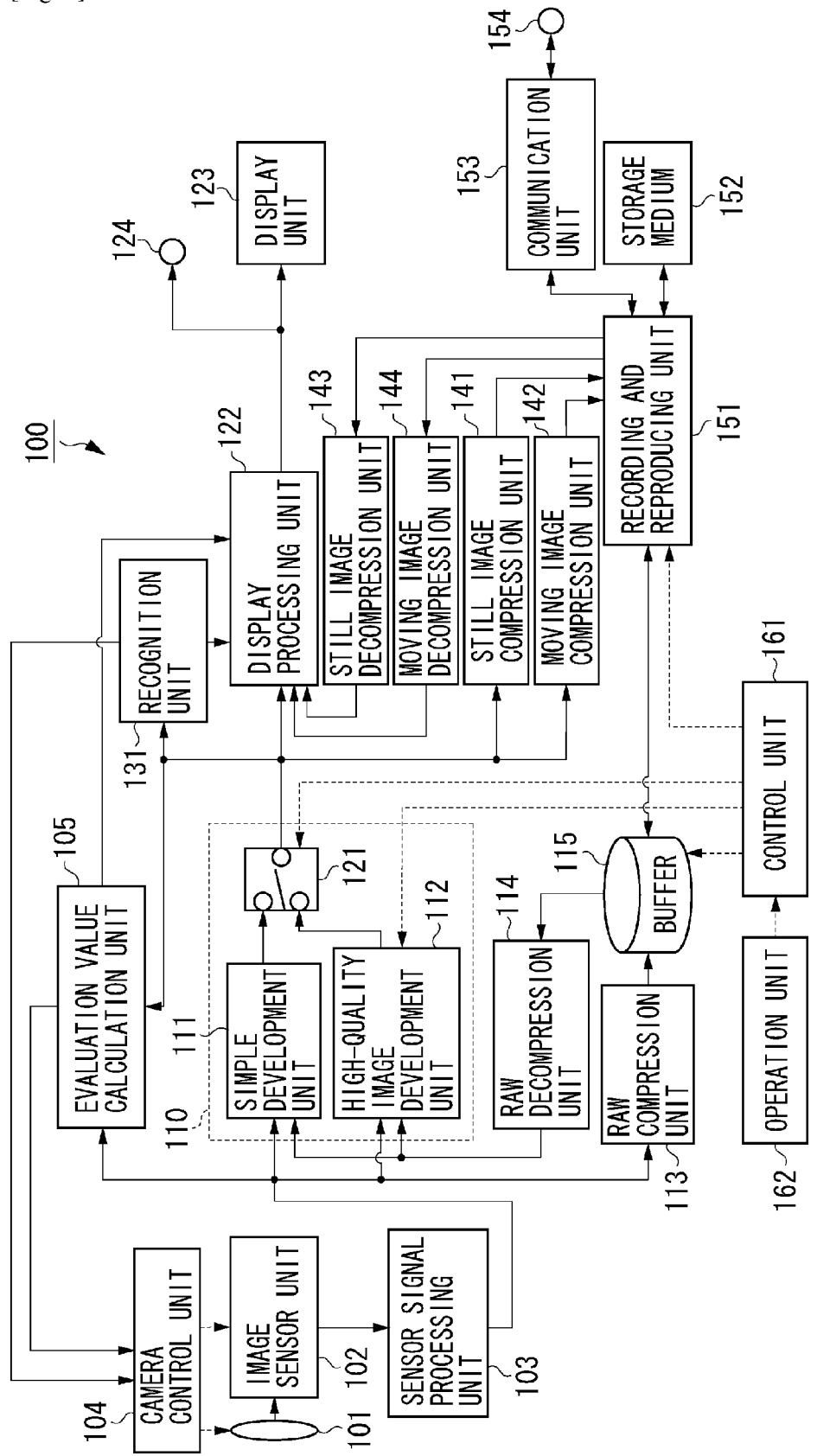

[Fig. 2]
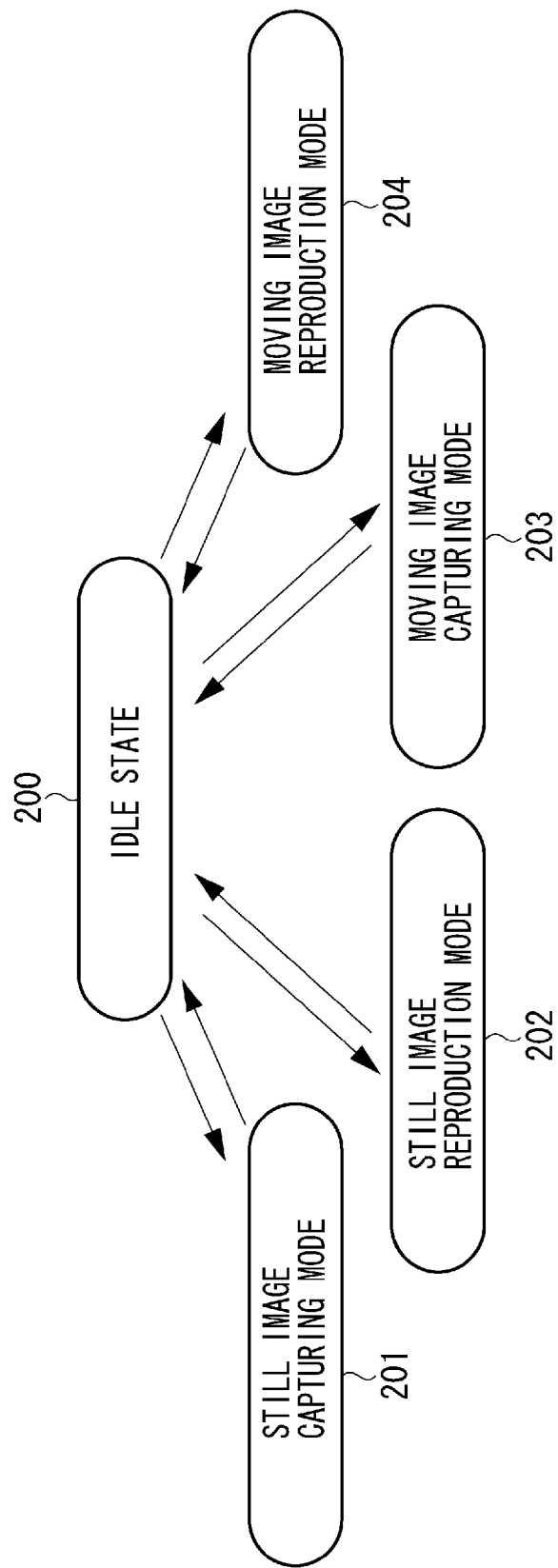

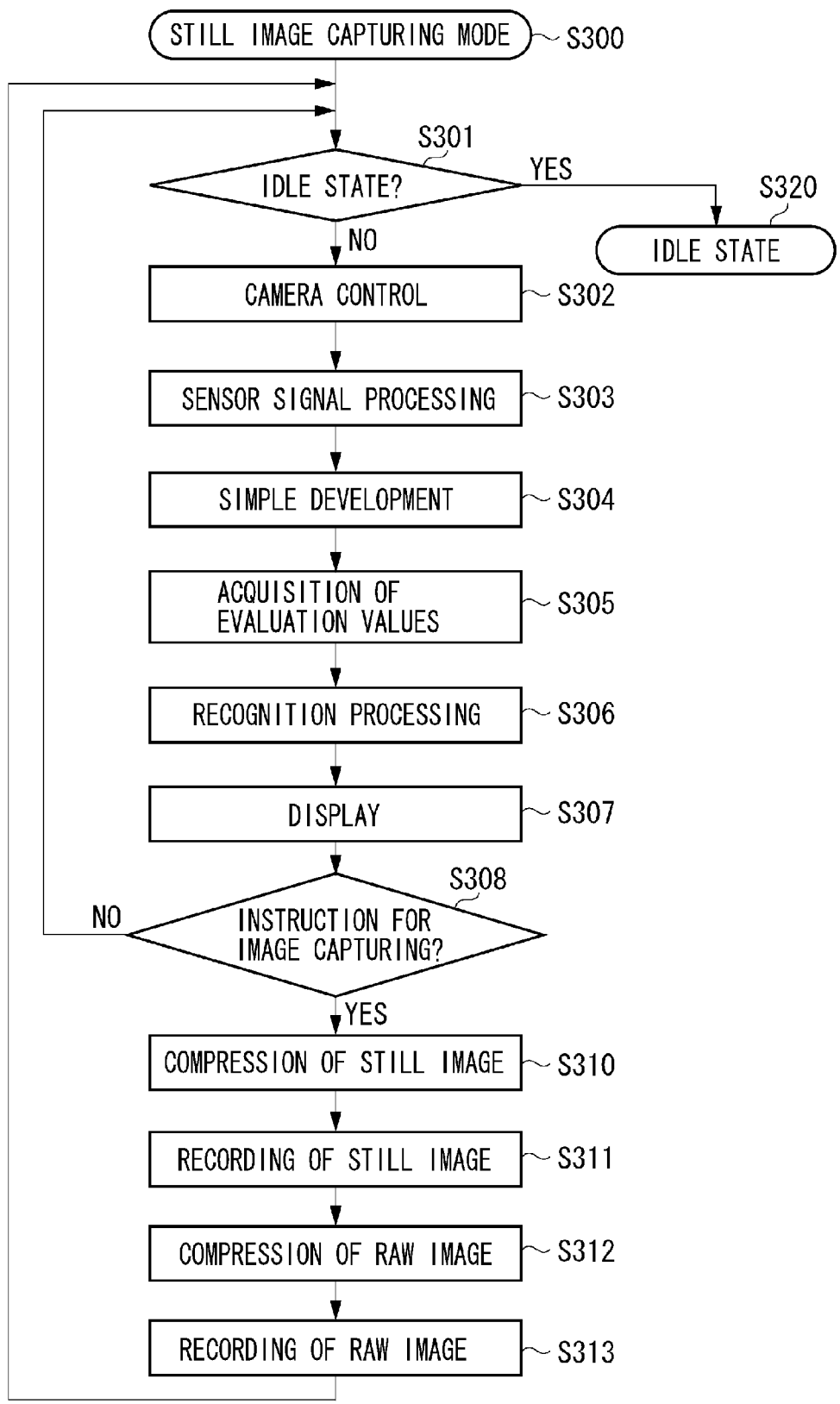

[Fig. 4A]
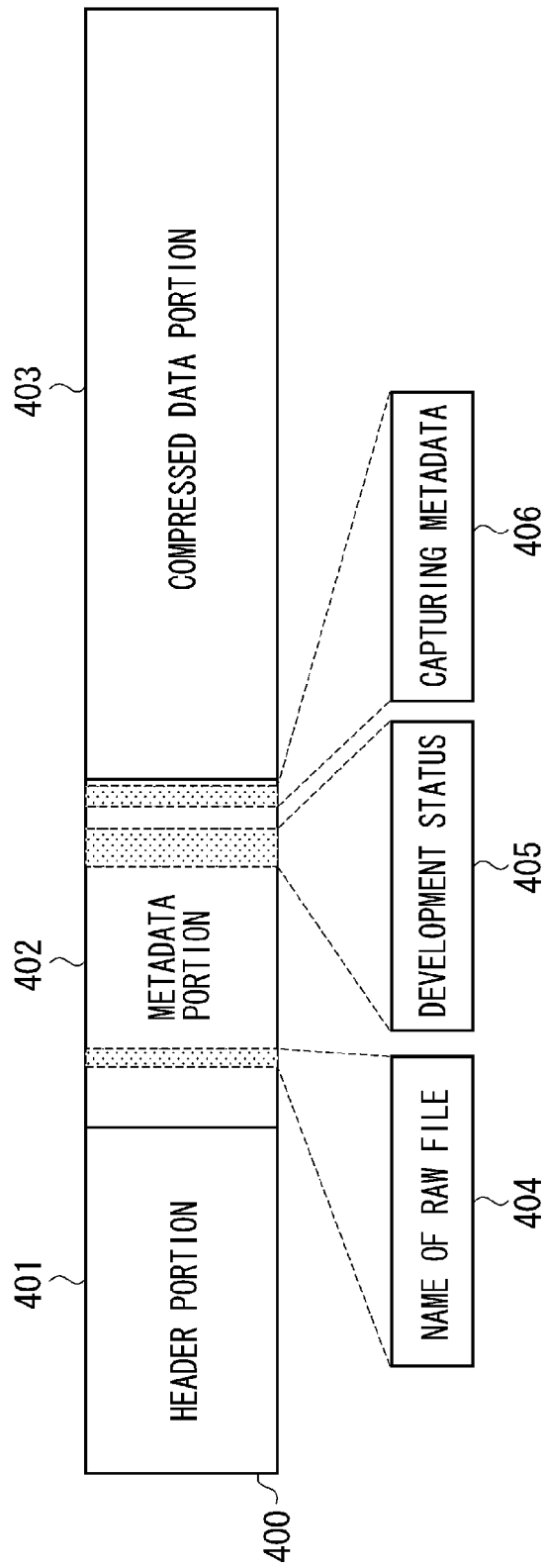

[Fig. 4B]
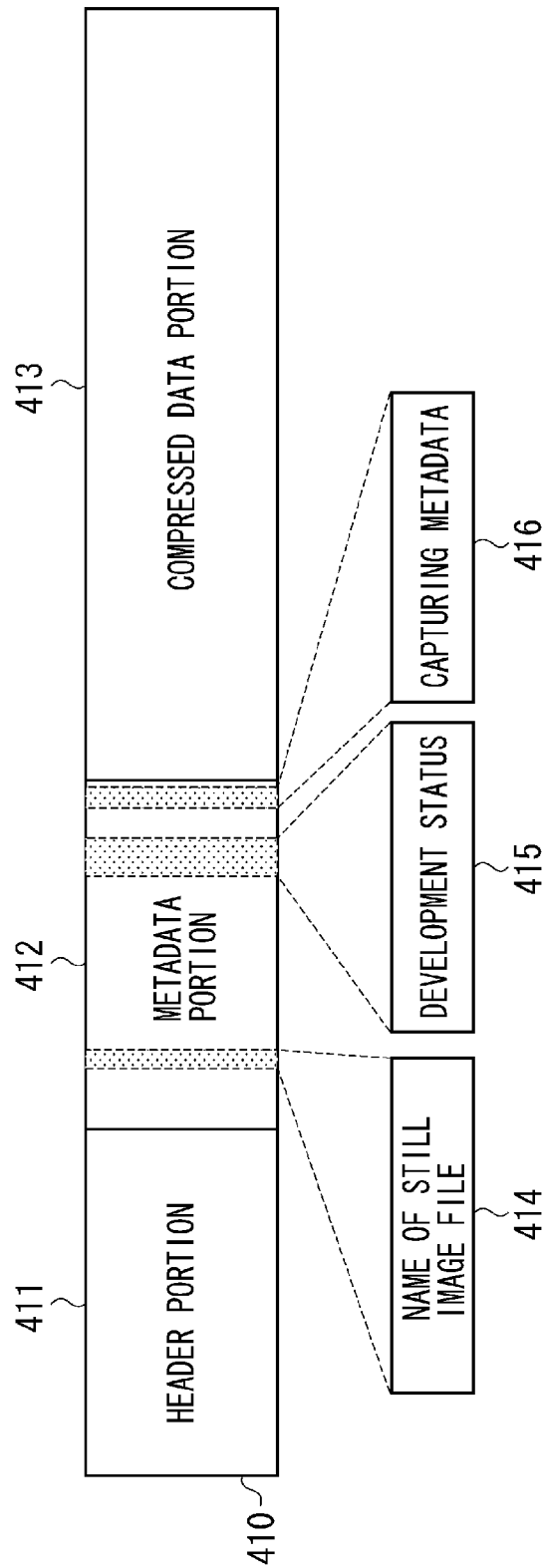

[Fig. 5]
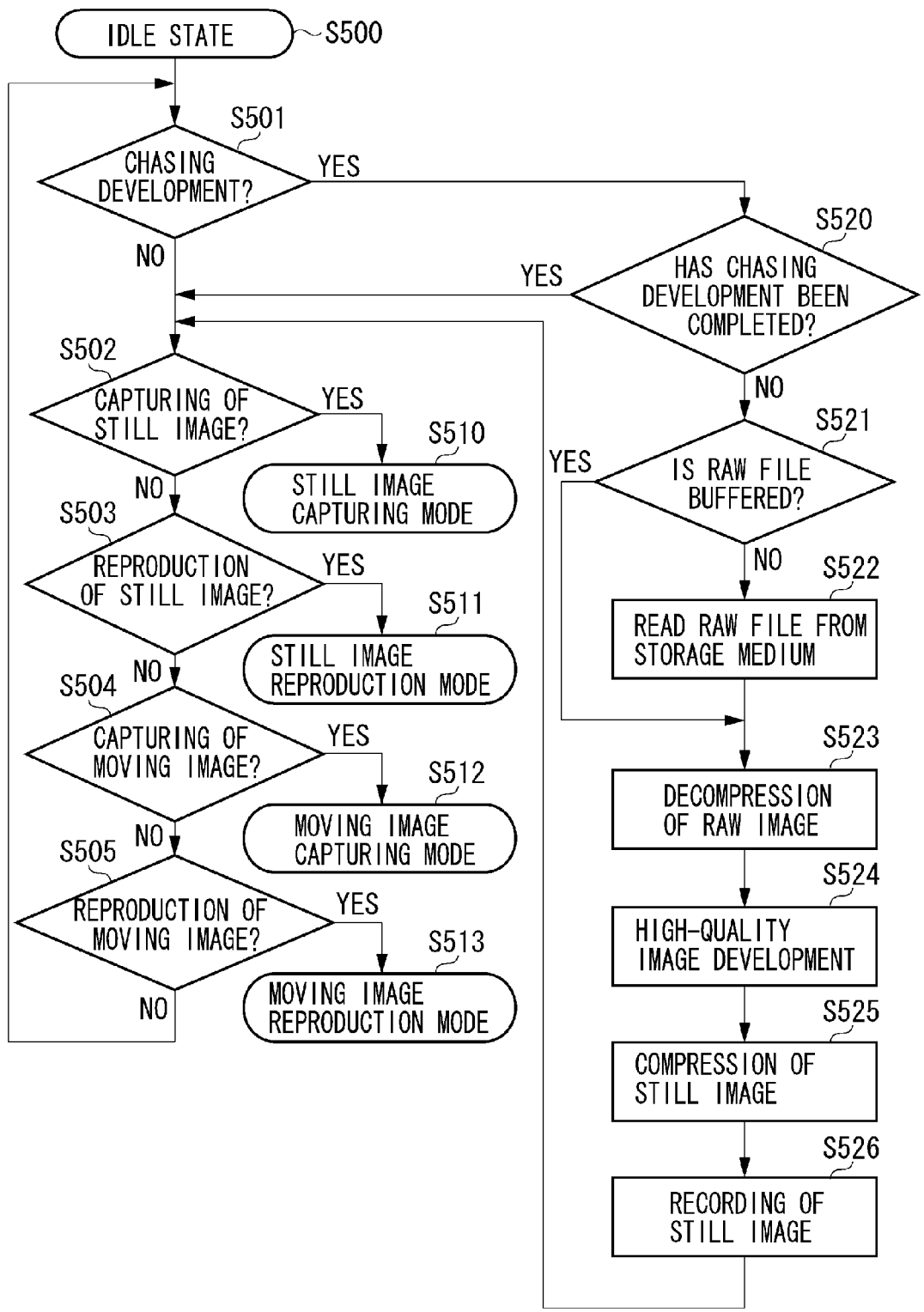

[Fig. 6]
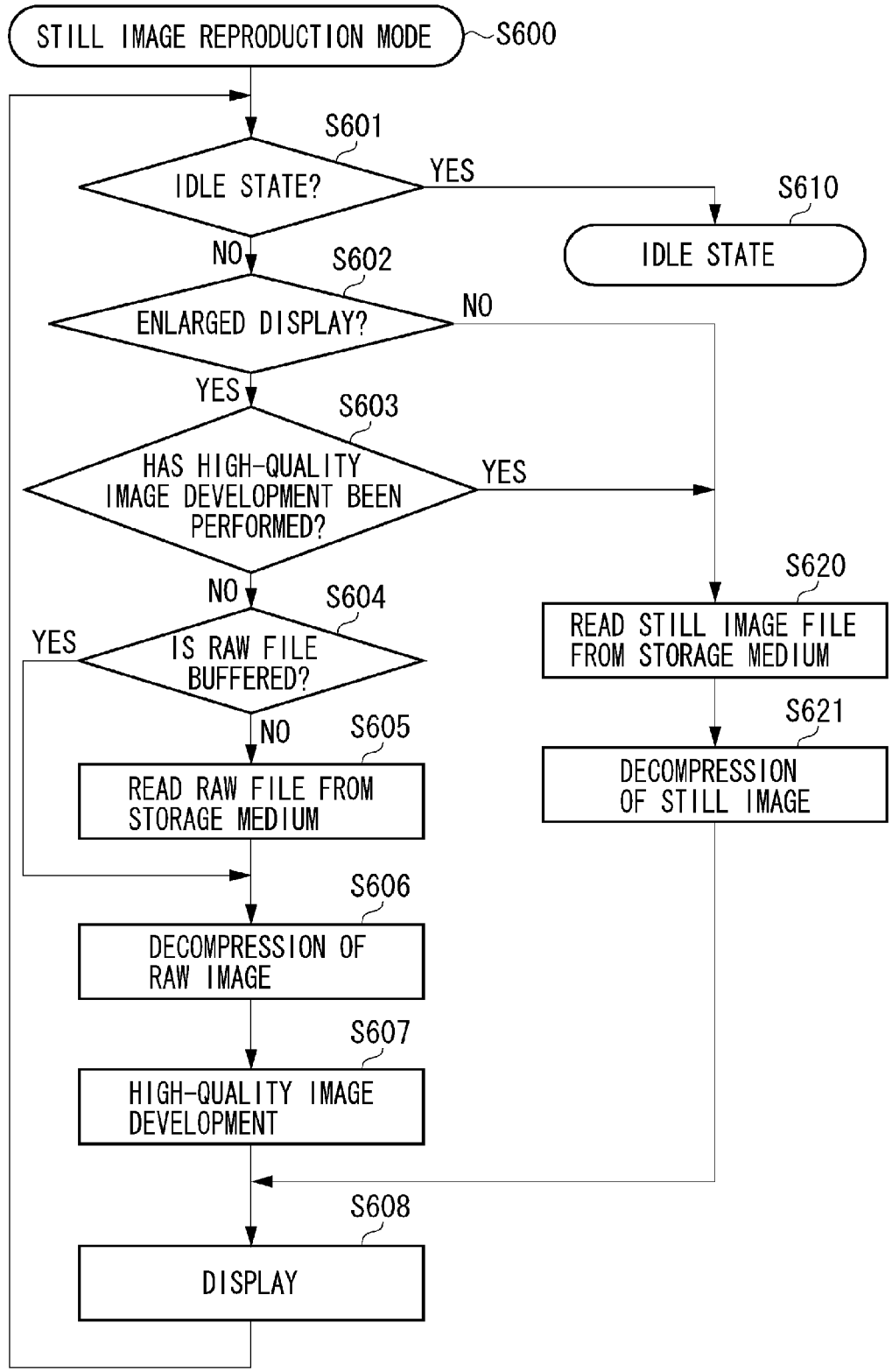

[Fig. 7A]
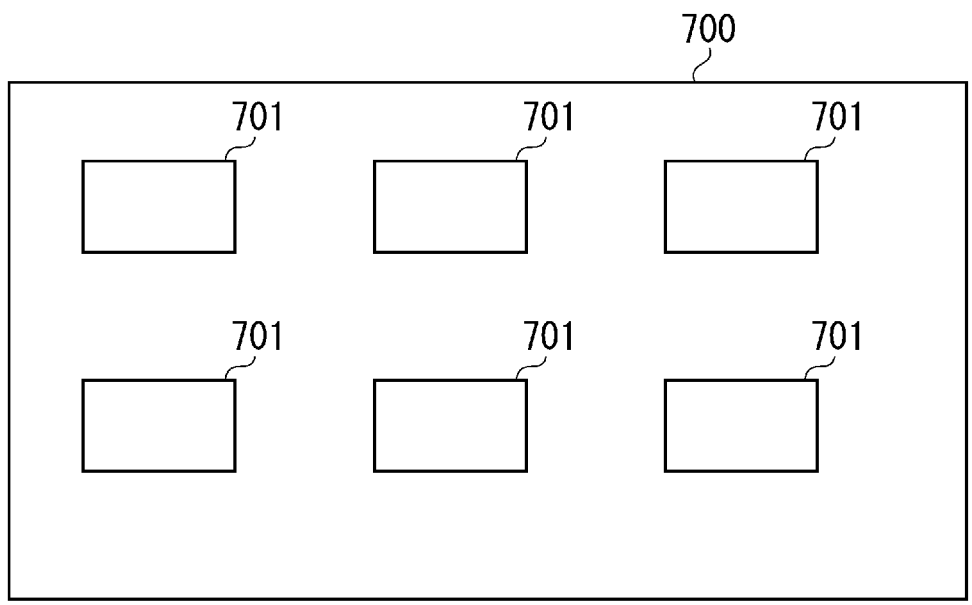
[Fig. 7B]
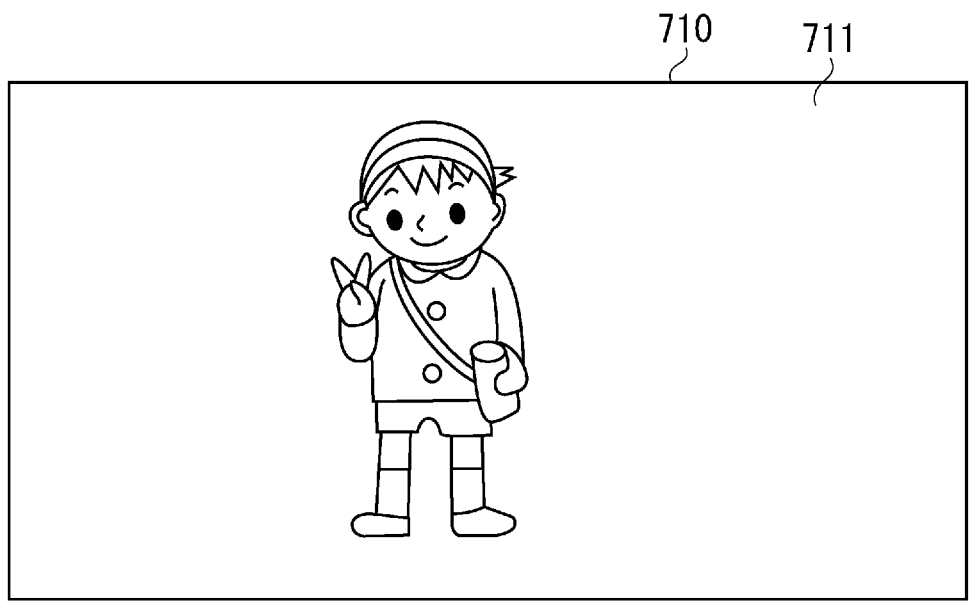

[Fig. 7C]
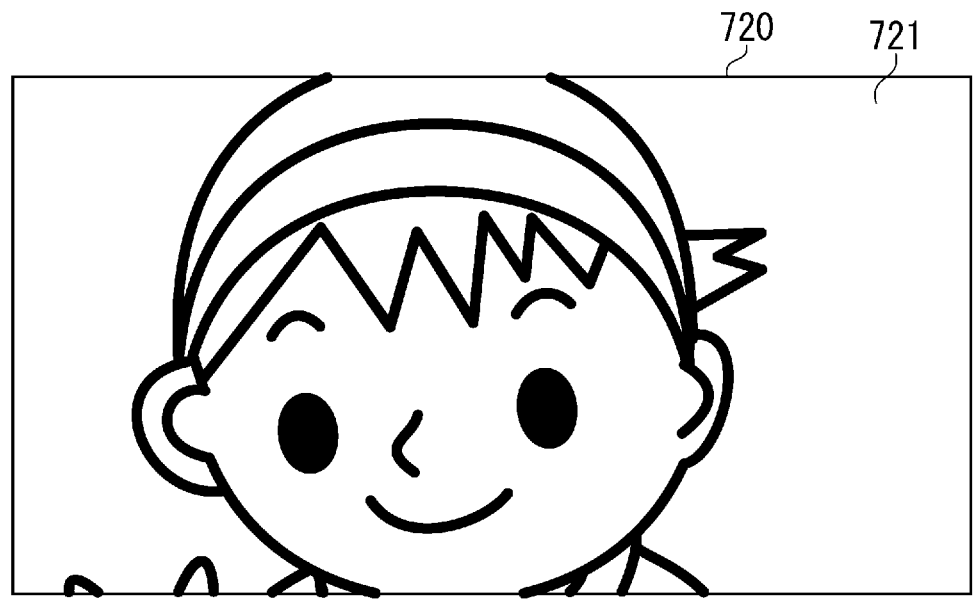

[Fig. 8]
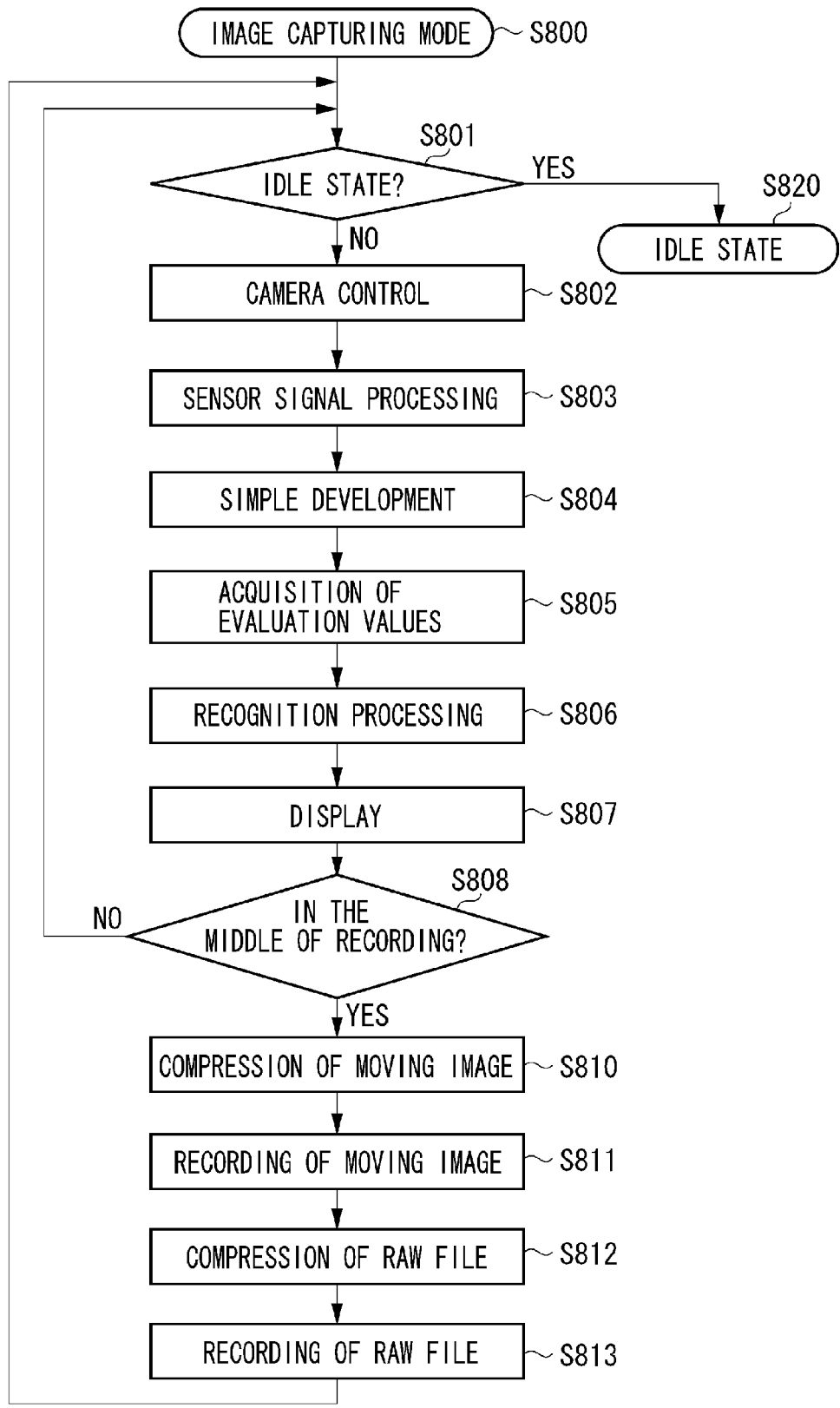

[Fig. 9A]
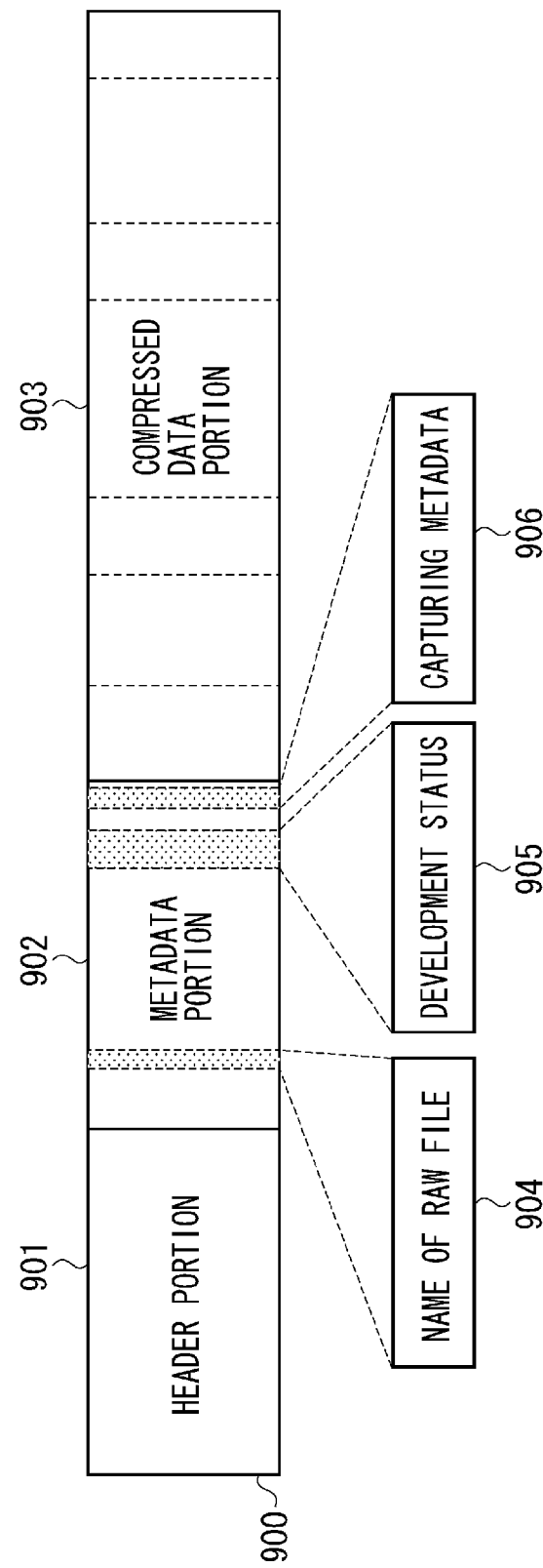

[Fig. 9B]
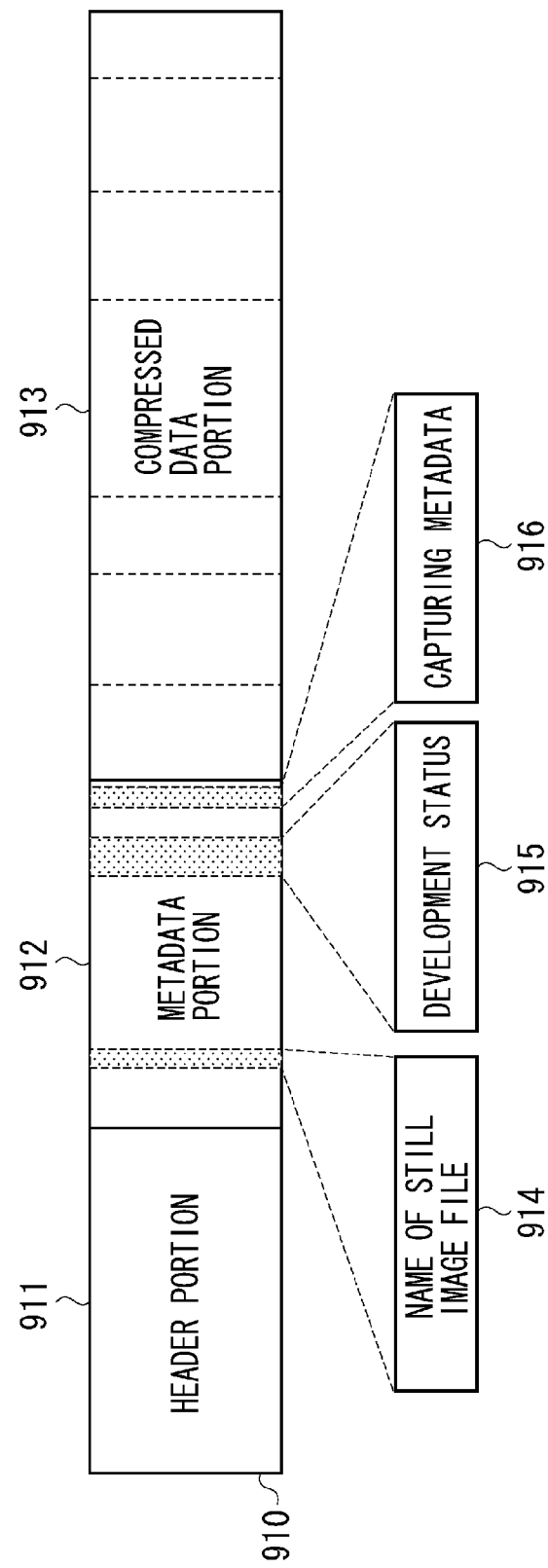

[Fig. 10]
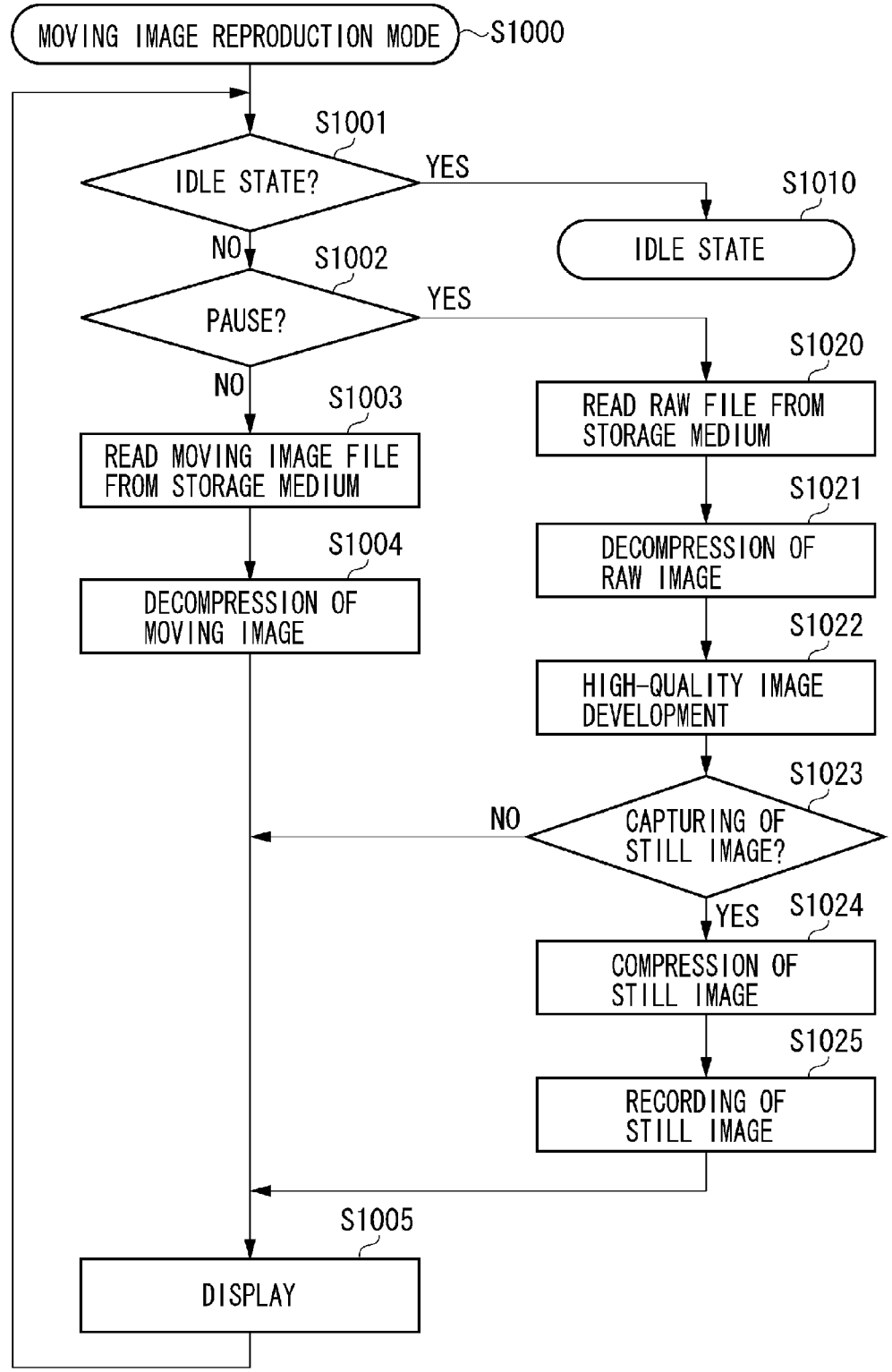

[Fig. 11]
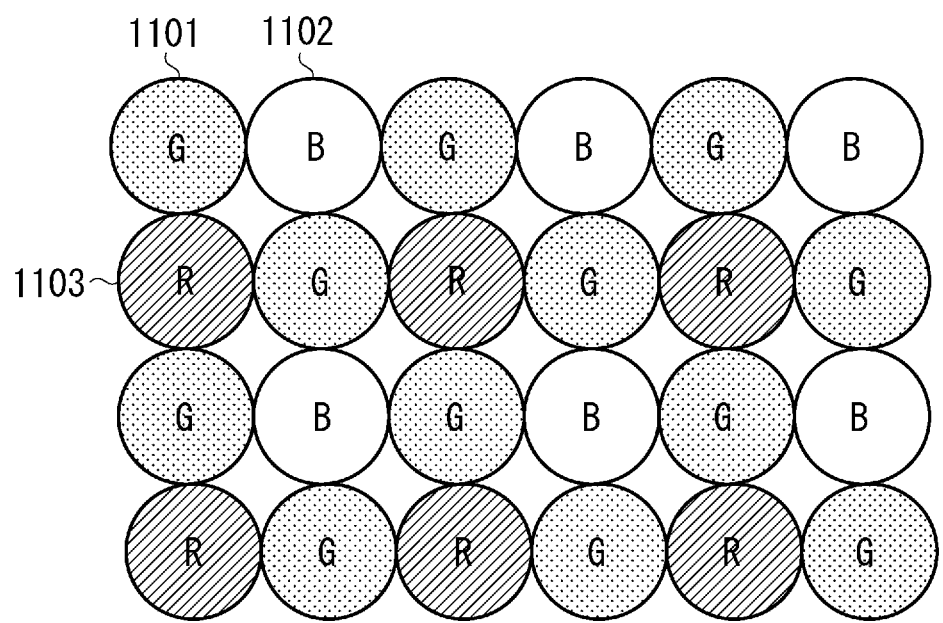

IMAGE PROCESSING APPARATUS AND IMAGE PROCESSING METHOD FOR HANDLING A RAW IMAGE, OF A MOVING IMAGE OR A STILL IMAGE

TECHNICAL FIELD

The present invention relates to an image processing apparatus and an image processing method. In particular, it relates to a technique for handling a RAW image of a moving image or a still image.

BACKGROUND ART

Conventionally, imaging apparatuses perform de-Bayer processing (de-mosaic processing) on raw image information (RAW image) captured by an image sensor, convert the image into signals including luminance and color difference, and perform so-called development processing including noise removal, optical distortion correction, and image optimization for each signal. Generally, after such development processing, the luminance and color-difference signals are compressed and coded and are finally recorded in a storage medium.

Other conventional imaging apparatuses are capable of recording RAW images. When a RAW image is recorded, a large amount of data needs to be recorded. However, since correction of or deterioration of original images can be minimized and RAW images can be edited after being captured, which are advantages in recording RAW images, advanced-level users preferably use this type of imaging apparatuses.

Japanese Patent Application Laid-Open No. 2011-244423 discusses an imaging apparatus capable of recording RAW images. According to Japanese Patent Application Laid-Open No. 2011-244423, development parameters are recorded along with a RAW image, and when reproduction is performed, these development parameters are used to develop and reproduce the RAW image.

In recent years, imaging apparatuses have been equipped with more advanced image sensors, and the number of pixels per image has been significantly increasing. In addition, a trend is that the number of images that can be continuously captured per second is increasing. Thus, the amount of processing including de-Bayer processing on a RAW image and development processing such as noise removal and optical distortion correction are synergistically increasing. As a result, performing real-time development processing simultaneously with an image capturing operation requires more circuits and power consumption. Development processing requires a larger circuit area or imposes constraints on power consumption. Therefore, in some cases, high image capturing performance cannot be achieved.

On the other hand, as discussed in the above Japanese Patent Application Laid-Open No. 2011-244423, if a RAW image is recorded without being developed, the amount of processing required for development during the image capturing operation could be reduced. However, since the RAW image is recorded without being developed, it is difficult to promptly reproduce and display the image. In addition, because of the particularity of data unique to RAW images, the RAW images may not be reproduced (developed) by other devices. Namely, with conventional RAW image recording methods, user-friendliness could be deteriorated.

Thus, there are problems to be addressed for enabling conventional apparatuses to achieve high image capturing performance and to promptly display reproduced images.

That is, it is necessary to mount high-cost circuits on the apparatuses and to drive the apparatuses with higher power or RAW images need to be recorded and reproduced promptly and simply.

CITATION LIST

Patent Literature

[PTL 1]
Japanese Patent Application Laid-Open No. 2011-244423

SUMMARY OF INVENTION

The present invention is directed to a technique for achieving prompt display of a reproduction image of a RAW image by using a configuration for recording a RAW image. In addition, the present invention is directed to a technique for achieving prompt display and high-quality image display of a necessary portion by using a developed and recorded image and a recorded RAW image.

According to one aspect of the present invention, an image processing apparatus includes an imaging unit configured to capture an object image and generate information representing a RAW image, a first development unit configured to acquire the information representing the RAW image and develop the RAW image, a storage unit configured to store an image file of an image developed by the first development unit and a RAW file which stores the information representing the RAW image directly as a RAW image in a memory, a second development unit configured to read the RAW file stored in the memory in a predetermined interval or in an idle state and develop the RAW image to obtain an image having higher image quality than that obtained by the first development unit, and a reproduction unit configured to reproduce, if an instruction for starting reproduction of a certain image is given and the second development unit has not completed developing of the RAW image, the image obtained from the image file and developed by the first development unit and to reproduce, if the second development unit has completed developing of the RAW image, the image developed by the second development unit.

Further features of the present invention will become apparent from the following description of exemplary embodiments with reference to the attached drawings.

BRIEF DESCRIPTION OF DRAWINGS

FIG. 1 is a block diagram illustrating a configuration of an imaging apparatus according to an exemplary embodiment of the present invention.

FIG. 2 is a state transition diagram according to the present exemplary embodiment.

FIG. 3 is a flowchart illustrating processing in a still image capturing mode according to the present exemplary embodiment.

FIG. 4A illustrates configurations of a still image file and a RAW file according to the present exemplary embodiment.

FIG. 4B illustrates configurations of a still image file and a RAW file according to the present exemplary embodiment FIG. 5 is a flowchart illustrating processing in an idle state according to the present exemplary embodiment.

FIG. 6 is a flowchart illustrating processing in a still image reproduction mode according to the present exemplary embodiment.

FIG. 7A illustrates display processing in the still image reproduction mode according to the present exemplary embodiment.

FIG. 7B illustrates display processing in the still image reproduction mode according to the present exemplary embodiment.

FIG. 7C illustrates display processing in the still image reproduction mode according to the present exemplary embodiment.

FIG. 8 is a flowchart illustrating processing in a moving image capturing mode according to the present exemplary embodiment.

FIG. 9A illustrates configurations of a moving image file and a RAW moving image file according to the present exemplary embodiment.

FIG. 9B illustrates configurations of a moving image file and a RAW moving image file according to the present exemplary embodiment.

FIG. 10 is a flowchart illustrating processing in a moving image reproduction mode according to the present exemplary embodiment.

FIG. 11 illustrates a pixel array.

DESCRIPTION OF EMBODIMENTS

Various exemplary embodiments, features, and aspects of the invention will be described in detail below with reference to the drawings.

FIG. 1 is a block diagram illustrating a configuration of an imaging apparatus 100 according to an exemplary embodiment of the present invention. The imaging apparatus 100 illustrated in FIG. 1 can not only record image information obtained by capturing an image of an object in a storage medium but also reproduce image information read from a storage medium. In addition, the imaging apparatus 100 can develop and display such image information and exchange the image information with external devices or servers (cloud), for example. Thus, the imaging apparatus 100 according to an exemplary embodiment of the present invention can be expressed as an image processing apparatus, a recording apparatus, a reproduction apparatus, a recording and reproduction apparatus, or a communication apparatus.

In FIG. 1, a control unit 161 includes a central processing unit (CPU) and a memory storing a control program to be executed by the CPU. The control unit 161 controls overall processing of the imaging apparatus 100. An operation unit 162 includes an input device including keys, buttons, and a touch panel for a user to give instructions to the imaging apparatus 100. The control unit 161 detects an operation signal from the operation unit 162 and controls the imaging apparatus 100 so that the imaging apparatus 100 performs an operation suitable for the operation signal. A display unit 123 includes a liquid crystal display (LCD) for displaying an image captured or reproduced by the imaging apparatus 100, a menu screen, and various types of information.

If a user gives an instruction for starting an image capturing operation via the operation unit 162, an optical image of a target object is input via an imaging optical unit 101 and the optical image is formed on an image sensor unit 102. When an image is captured, a camera control unit 104 controls operations of the imaging optical unit 101 and the image sensor unit 102, based on calculation results of evaluation values about the diaphragm, the focus, the camera shake, and the like acquired by an evaluation value calculation unit 105 and based on object information about a face recognition result or the like extracted by a recognition unit 131.

The image sensor unit 102 converts light transmitted through red, green, and blue (RGB) mosaic color filters into electrical signals, one filter being arranged for each pixel. FIG. 11 illustrates color filters arranged in the image sensor unit 102. FIG. 11 illustrates a pixel array of an image handled by the imaging apparatus 100. As illustrated in FIG. 11, the red (R), green (G), and blue (B) filters are arranged in a mosaic pattern, one filter being arranged per pixel. Each set of 4 pixels in 2 rows and 2 columns (one red pixel, one blue pixel, and two green pixels) is regularly arranged side by side. Such pixel arrangement is generally called a Bayer array.

A sensor signal processing unit 103 performs pixel restoration processing on the converted electrical signal obtained by the image sensor unit 102. The sensor signal processing unit 103 performs the restoration processing on values of missing pixels or low-reliability pixels obtained by the image sensor unit 102, by using values of neighboring pixels. In this way, the sensor signal processing unit 103 interpolates restoration target pixels and subtracts predetermined offset values. In the present exemplary embodiment, the image information output from the sensor signal processing unit 103 is referred to as RAW image information (which will hereinafter be referred to as a RAW image), which signifies an raw (undeveloped) image (control until 104, imaging optical unit 101, image sensor unit 102, and sensor processing unit 103 can also be referred to as a imaging unit).

A development unit 110 develops such RAW image. The development unit 110 includes a plurality of different development processing units. The development unit 110 includes a simple development unit 111 as a first development unit and a high-quality image development unit 112 as a second development unit. In addition, the development unit 110 includes a switch unit 121 selecting an output from the unit 111 or 112. Both the simple development unit 111 and the high-quality image development unit 112 perform de-Bayer processing (de-mosaic processing), namely, color interpolation processing, on a RAW image. These development units 111 and 112 convert the RAW image into luminance and color difference (or primary color) signals, remove noise included in each signal, correct optical distortion, and optimize the image. Namely, these development units 111 and 112 perform so-called development processing.

In particular, the high-quality image development unit 112 performs each processing more accurately than the simple development unit 111. By performing each processing more accurately, the high-quality image development unit 112 produces a developed image with higher image quality than that produced by the simple development unit 111. However, the processing load of the high-quality image development unit 112 is larger than that of the simple development unit 111. Thus, the high-quality image development unit 112 in the present exemplary embodiment is not configured such as to perform real-time development simultaneously with an image capturing operation. The high-quality image development unit 112 is configured to be capable of performing distributed processing when there is sufficient time in an idle period after an image capturing operation. By allowing the high-quality image development unit 112 to perform high-quality image development when there is sufficient time after an image capturing operation, instead of performing the high-quality image development during an image capturing operation, the increase (peak) in circuit scale or power consumption can be reduced to a low level. In contrast, the simple development unit 111 is configured to require a lower processing amount for development than that required for the high-quality image development, so that the simple development unit 111 can perform development processing more quickly than the high-quality image development unit 112 during an image capturing operation. However, a developed image produced by the simple development unit 111 has lower quality than that produced by the high-quality image development unit 112. Since the processing load of the simple development unit 111 is lower, the simple development unit 111 is mainly used when the imaging apparatus 100 performs real-time development simultaneously with an image capturing operation. The switch unit 121 is changed over by the control unit 161 in accordance with an operation input by the user via the operation unit 162, or a current operation mode. In addition, only one unit to which a signal is output, namely, either the simple development unit 111 or the high-quality image development unit 112, may perform a development operation, in conjunction with change-over of the switch unit 121.

In the present exemplary embodiment, the development unit 110 separately includes the simple development unit 111 and the high-quality image development unit 112. However, alternatively, a single development unit may be arranged to selectively perform simple development processing and high-quality image development processing by switching an operation mode.

A display processing unit 122 performs predetermined display processing on the image information developed by the development unit 110. Next, the display unit 123 displays the image. In addition, the developed image information can be output to an external display device via a video output terminal 124. Examples of the video output terminal 124 include a general-purpose interface such as a high-definition multimedia interface (HDMI) or a serial digital interface (SDI).

The image information developed by the development unit 110 is also supplied to the evaluation value calculation unit 105. The evaluation value calculation unit 105 calculates evaluation values such as those indicating the focus state and the exposure state from the image information.

The image information developed by the development unit 110 is also supplied to the recognition unit 131. The recognition unit 131 has a function of detecting and recognizing object information such as a face or a person in the image information. For example, if the recognition unit 131 detects a face on a screen represented by the image information, the recognition unit 131 outputs information representing the position of the face. In addition, for example, the recognition unit 131 performs authentication of a certain person, based on information about a feature such as a face.

The image information developed by the development unit 110 is supplied to a still image compression unit 141 or a moving image compression unit 142. The still image compression unit 141 and the moving image compression unit 142 are used for compressing the image information as a still image and as a moving image, respectively. The still image compression unit 141 and the moving image compression unit 142 perform high-efficiency coding (compression coding) on the target image information, generate image information having a compressed information amount, and convert the image information into an image file (a still image file or a moving image file). JPEG or the like can be used for compression of a still image while MPEG-2, H.264, H.265, or the like can be used for compression of a moving image.

A RAW compression unit 113 performs high-efficiency coding on data of the RAW image output from the sensor signal processing unit 103, by using a technique such as wavelet transform or differential coding, converts the data into a compressed RAW file, and stores the RAW file in a buffer unit (storage medium) 115. The RAW file can be stored in the buffer unit 115 and the stored RAW file can be read again. However, after being stored in the buffer unit 115, the RAW file may be moved to and stored in another storage medium (the RAW file may be deleted from the buffer unit 115).

The RAW file and the above still image file and moving image file are recorded in a storage medium 152 by a recording and reproducing unit 151 (recording and reproducing unit 151 and storage medium 152 can also be referred to as a storage unit). The storage medium 152 may be a built-in large-capacity semiconductor memory, a hard disk, a removable memory card, or the like. The recording and reproducing unit 151 can read these still image file, moving image file, and RAW file from the storage medium 152.

The recording and reproducing unit 151 can write and read various files to and from an external storage or server via a communication unit 153. The communication unit 153 can access the Internet or an external device via wireless or wired communication, by using a communication terminal 154.

When a reproduction operation is started, the recording and reproducing unit 151 acquires a desired file from the storage medium 152 or via the communication unit 153 and reproduces the file. If the file to be reproduced is a RAW file, the recording and reproducing unit 151 stores the acquired RAW file in the buffer unit 115. If the file to be reproduced is a still image file, the recording and reproducing unit 151 supplies the acquired still image file to a still image decompression unit 143. If the file to be reproduced is a moving image file, the recording and reproducing unit 151 supplies the acquired moving image file to a moving image decompression unit 144.

The RAW decompression unit 114 reads a RAW file stored in the buffer unit 115 and decodes and decompresses the compressed RAW file. The RAW file decompressed by the RAW decompression unit 114 is supplied to the development unit 110 and is input to the simple development unit 111 or the high-quality image development unit 112 in the development unit 110.

The still image decompression unit 143 decodes and decompresses an input still image file and supplies the file to the display processing unit 122 as a still image to be reproduced. The moving image decompression unit 144 decodes and decompresses an input moving image file and supplies the file to the display processing unit 122 as a moving image to be reproduced.

Next, operation modes of the imaging apparatus 100 according to the present exemplary embodiment will be described in detail with reference to the drawings. FIG. 2 is a state transition diagram illustrating transition of operation modes of the imaging apparatus 100. Transition of these modes is performed in accordance with a user operation instruction input via the operation unit 162 or a control operation performed by the control unit 161. In addition, transition of these modes is performed manually or automatically based on an operation. As illustrated in FIG. 2, four modes of a still image capturing mode (201), a still image reproduction mode (202), a moving image capturing mode (203), and a moving image reproduction mode (204) are suitably switched. The imaging apparatus 100 operates in one of these modes via an idle state (200).

Next, an operation in the still image capturing mode of the imaging apparatus 100 will be described.

FIG. 3 is a flowchart illustrating processing in a still image capturing mode according to the present exemplary embodiment. The flowchart in FIG. 3 illustrates a processing procedure performed when the control unit 161 controls each processing block. More specifically, the processing procedure is performed when the control unit 161 expands a program stored in a read-only memory (ROM) of the control unit 161 to a random access memory (RAM) and executes the program.

In FIG. 3, in step S300, processing in the still image capturing mode is started. Next, in step S301, the control unit 161 determines whether the processing load of the imaging apparatus 100 is low. If the control unit 161 determines that the processing load is low (YES in step S301), the operation proceeds to step S320 and the imaging apparatus 100 shifts to an idle state with a frequency according to a load state. If not (NO in step S301), the operation proceeds to step S302. For example, the processing load is high during a high-speed continuous image capturing operation. Thus, in such a case, the operation does not proceed to step S320 but always proceeds to step S302. When a normal single image capturing operation is performed, between first and second capturing operations, for example, half of the operations proceeds to step S320.

In step S302, the camera control unit 104 controls operations of the imaging optical unit 101 and the image sensor unit 102 so that images are captured under suitable conditions. For example, a lens included in the imaging optical unit 101 is moved in accordance with a user instruction for zooming or focusing. In addition, the area read by the image sensor unit 102 is set in accordance with an instruction about the number of pixels to be captured. In addition, control operations such as focus adjustment and tracking control of a certain object are performed based on evaluation value information and object information supplied from the evaluation value calculation unit 105 and the recognition unit 131 as described below.

In step S303, the sensor signal processing unit 103 performs signal processing for pixel restoration on the converted electrical signal obtained by the image sensor unit 102. Namely, by using values of neighboring pixels, the sensor signal processing unit 103 interpolates values of missing pixels and low-reliability pixels. In addition, the sensor signal processing unit 103 subtracts predetermined offset values. In the present exemplary embodiment, the image information output from the sensor signal processing unit 103 after step S303 is referred to as a RAW image, which signifies a law (undeveloped) image.

Next, in step S304, the simple development unit 111 develops the RAW image. In this step S304, the control unit 161 changes over the switch unit 121 in the development unit 110 to select output of image information that has been developed by the simple development unit 111.

The simple development unit 111 performs de-Bayer processing (de-mosaic processing), namely, color interpolation processing, on the RAW image, converts the RAW image into luminance and color difference (or primary color) signals, removes noise included in each signal, corrects optical distortion, and optimizes the image. Namely, the simple development unit 111 performs so-called development processing. Next, the development processing (simple development) performed by the simple development unit 111 will be described. By performing the processing in a lower amount of than that performed by the high-quality image development unit 112, the simple development unit 111 realizes quicker and simpler development processing. For example, the simple development unit 111 limits the developed image size to 2 million pixels or less. Alternatively, the simple development unit 111 performs only limited processing for noise removal or optical distortion correction or omits performing such processing. Since the simple development unit 111 performs processing on a reduced image size or performs limited development processing, for example, the imaging apparatus 100 can achieve an image capturing operation of 2 million pixels and 60 frames per second with a smaller circuit scale and less power consumption.

The image information developed by the simple development unit 111 is supplied to the evaluation value calculation unit 105. In step S305, the evaluation value calculation unit 105 calculates evaluation values such as those indicating the focus state and the exposure state, based on a luminance value, a contrast value, and the like included in the image information. The evaluation value calculation unit 105 may acquire an undeveloped RAW image and calculate evaluation values from the RAW image in a similar way.

In addition, the image information developed by the simple development unit 111 is also supplied to the recognition unit 131. In step S306, the recognition unit 131 detects an object (a face, for example) from the image information and recognizes object information. For example, the recognition unit 131 detects presence or absence of a face in the image information. If a face exists, the recognition unit 131 detects the position of the face, authenticates a certain person, and outputs the result as information.

In addition, the image information developed by the simple development unit 111 is also supplied to the display processing unit 122. In step S307, the display processing unit 122 forms a display image from the acquired image information and outputs the display image to the display unit 123 or an external display device to display the image. In the still image capturing mode, the display image presented by the display unit 123 is used for live view display (a through-the-lens image) so that the user can appropriately frame the object. The display image may be transmitted from the display processing unit 122 to another display device such as an external television via the video output terminal 124 so that the display device can present the display image. In addition, by using the evaluation value information and object information supplied from the evaluation value calculation unit 105 and the recognition unit 131, the display processing unit 122 can present markings on focus areas on the display image and frames on the recognized face positions, for example.

In step S308, the control unit 161 determines whether an instruction for an image capturing operation is input from the user. If so (YES in step S308), the operation proceeds to step S310. If not (NO in step S308), the operation returns to step S301 and preparatory operations for an image capturing operation and live view display are repeated.

If the control unit 161 determines an instruction for an image capturing operation has been input (YES in step S308), the image information obtained by the development processing of the simple development unit 111 is supplied to the still image compression unit 141. Namely, in step S310, the still image compression unit 141 performs high-efficiency coding (compression of the still image) on the acquired image information and creates a still image file. The still image compression unit 141 performs compression processing by using a known still image compression technique such as Joint Photographic Experts Group (JPEG).

Next, in step S311, the recording and reproducing unit 151 records the still image file in the storage medium 152.

Next, in step S312, in response to the instruction for an image capturing operation (YES in step S308), the RAW compression unit 113 acquires a RAW image that corresponds to the captured still image and that is output from the sensor signal processing unit 103 and performs high-efficiency coding (compression of the RAW image) on the RAW image, to convert the RAW image into a RAW file. The RAW file is stored in the buffer unit 115. The RAW compression unit 113 performs the high-efficiency coding by using a known technique such as wavelet transform or differential coding. Either lossy coding or lossless coding may be used. Alternatively, the RAW compression unit 113 may omit compression of the RAW image. Namely, the RAW compression unit 113 may directly output the RAW image without compressing the RAW image. Regardless of whether the RAW image is compressed or not, according to the present exemplary embodiment, a RAW file that is not significantly deteriorated from the image information supplied from the sensor signal processing unit 103 and that can be restored as a high-quality image file is created.

In step S313, the recording and reproducing unit 151 records the RAW file in the storage medium 152. Next, the operation proceeds to step S301. In steps S311 and S313, the recording and reproducing unit 151 may transmit the still image file and/or the RAW file to an external storage via the communication unit 153 and the communication terminal 154 so that the still image file and/or the RAW file can be recorded in the external storage.

A flow of processing in the still image capturing mode according to the present exemplary embodiment has thus been described.

Next, configurations of a still image file and a RAW file according to the present exemplary embodiment will be described. FIGS. 4A and 4B illustrate configurations of a still image file and a RAW file.

A still image file 400 illustrated in FIG. 4A is recorded by the recording and reproducing unit 151 in a predetermined recording area of the storage medium 152, for example. The still image file 400 includes a header portion 401, a metadata portion 402, and a compressed data portion 403. The header portion 401 includes an identification code representing that this file is in a still image file format, for example. The compressed data portion 403 includes compressed data of the still image on which high-efficiency coding has been performed.

The metadata portion 402 includes information 404 about the name of the RAW file generated simultaneously with this still image file. In addition, the metadata portion 402 includes development status information 405 representing that this still image file has been obtained by the simple development unit 111 performing the simple development. In addition, the metadata portion 402 includes shooting metadata 406 including evaluation values and object information detected by the evaluation value calculation unit 105 and the recognition unit 131, respectively, and information obtained during an image capturing operation by the imaging optical unit 101 and the image sensor unit 102 (for example, lens type identification information and sensor type identification information). In addition, while not illustrated, the metadata portion 402 may include an identification code of a storage medium in which the simultaneously-generated RAW file is recorded, path information about a folder in which the RAW file is recorded, and the like.

A RAW file 410 illustrated in FIG. 4B is recorded by the recording and reproducing unit 151 in a predetermined recording area of the storage medium 152, for example. The RAW file 410 includes a header portion 411, a metadata portion 412, and a compressed data portion 413. The header portion 411 includes an identification code representing that this file is in a RAW file format. The compressed data portion 413 includes RAW compressed data of the still image on which high-efficiency coding has been performed (or RAW image data of the still image that has not been compressed).

The metadata portion 412 includes information 414 about the name of the still image file generated simultaneously with this RAW file. In addition, the metadata portion 412 includes development status information 415 representing that this still image file has been obtained by the simple development unit 111 performing the simple development by. In addition, the metadata portion 412 includes shooting metadata 416 including evaluation values and object information detected by the evaluation value calculation unit 105 and the recognition unit 131, and information obtained during an image capturing operation by the imaging optical unit 101 and the image sensor unit 102 (for example, lens type identification information and sensor type identification information). If data in the shooting metadata 416 is a common one with that in the shooting metadata 406, the same data is used. In addition, while not illustrated, the metadata portion 412 may include an identification code of a storage medium in which the simultaneously-generated still image file is recorded and path information about a folder in which the still image file is recorded. Alternatively, the simultaneously-generated still image file itself may be formed as metadata and stored in the metadata portion 412.

The above configurations of various files according to the present exemplary embodiment are examples. Other configurations compatible with standards such as Design rule for Camera File system (DCF) or Exchangeable Image File format (EXIF) may be used.

As described above, the simple development unit 111 of the imaging apparatus 100 according to the present exemplary embodiment performs live view display in the still image capturing mode until an instruction for an image capturing operation is input. In addition, in response to an instruction for an image capturing operation, the simple development unit 111 performs development processing to generate a still image file. For example, the simple development unit 111 limits the developed image size to 2 million pixels or less or only performs limited noise removal or optical distortion correction. Alternatively, the simple development unit 111 omits such processing. In this way, for example, the imaging apparatus 100 can perform development processing of 2 million pixels and 60 frames per second with a smaller circuit scale and less power consumption. In addition, as described above, the imaging apparatus 100 according to the present exemplary embodiment generates a RAW file in response to an instruction for capturing a still image. The RAW file is a high-quality image file that is not significantly deteriorated from the image information supplied from the sensor signal processing unit 103. Generation of this file does not require development processing. Thus, it is possible to record the RAW file with a smaller circuit scale and less power consumption while increasing the number of image pixels or the speed of a continuous image capturing operation.

Next, step S320 to which the processing proceeds as a result of determination in step S301 in FIG. 3, will be described with reference to a flowchart in FIG. 5. FIG. 5 illustrates a flowchart illustrating processing in an idle state according to the present exemplary embodiment. The flowchart in FIG. 5 illustrates a processing procedure performed when the control unit 161 controls each processing block. More specifically, the processing procedure is performed when the control unit 161 expands a program stored in a ROM of the control unit 161 to a RAM and executes the program.

In FIG. 5, in step S500, processing in the idle state is started. Next, in step S501, the control unit 161 determines whether chasing development needs to be performed based on a user setting. If chasing development does not need to be performed (NO in step S501), the operation proceeds to step S502. Otherwise (YES in step S501), the operation proceeds to step S520.

In steps S502, S503, S504, and S505, the control unit 161 determines to shift to any of the modes 201 to 204 illustrated in FIG. 2 in accordance with an instruction from the user or a mode setting. Next, the control unit 161 controls the imaging apparatus 100 to shift to a processing flow in the selected mode (in the selected one of the steps S510, S511, S512, and S513). In step S502, if the control unit 161 determines that capturing of a still image is required (YES in step S502), the operation proceeds to step S510. If not (NO in step S502), the operation proceeds to step S503. In step S503, if the control unit 161 determines that reproduction of a still image is required (YES in step S503), the operation proceeds to step S511. If not (NO in step S503), the operation proceeds to step S504. In step S504, if the control unit 161 determines that capturing of a moving image is required (YES in step S504), the operation proceeds to step S512. If not (NO in step S504), the operation proceeds to step S505. In step S505, if the control unit 161 determines that reproduction of a moving image is required (YES in step S505), the operation proceeds to step S513.

In the chasing development according to the present exemplary embodiment, an undeveloped RAW file that has been obtained by an image capturing operation and recorded in the buffer unit 115, the storage medium 152, or the like is read during an image capturing operation, in an interval between reproductions, in a sleep state, or the like. In the chasing development, high-quality image development processing is performed on the read RAW file, and a high-quality display image or a high-quality still image file is generated. Since the imaging apparatus 100 performs development processing on a previously-recorded RAW file as if the imaging apparatus 100 chases the RAW file, this development processing is called chasing development. While the chasing development according to the present exemplary embodiment can be performed on both the RAW file of a still image and the RAW file of a moving image, the description will be made based on the RAW file of a still image in what follows.

As described above, since a still image file generated during an image capturing operation is developed by the simple development unit 111, the number of pixels is 2 million or less or part of the development processing is omitted. As a result, image quality is limited. While the captured image can be effectively used for general checking, the image may not be sufficient to check details of the image or to be printed. However, while the RAW file simultaneously generated with the still image has high image quality that has not significantly been deteriorated from the image information supplied from the sensor signal processing unit 103, the RAW file cannot be displayed or printed promptly since the RAW file is data before development processing. Namely, development of the RAW file requires time. In addition, since the RAW file is not a widely-used file such as JPEG, reproduction environments in which the RAW file can be handled are limited.

Consequently, the chasing development according to the present exemplary embodiment can be used as an effective function. In the present exemplary embodiment, when the chasing development is performed, a RAW file that has already been recorded is read and development processing is performed by the high-quality image development unit 112 to form a high quality image, and the generated high-quality still image file is recorded in the storage medium 152 or the like. The imaging apparatus 100 performs the chasing development in a state of relatively low processing load in which the imaging apparatus 100 waits for a user operation, for example, in an interval between image capturing operations, in a reproduction mode, or in a sleep state. The chasing development can be designed to be performed not only manually by the user but also automatically by the control unit 161.

In this way, after the chasing development, if high quality image reproduction is requested, for example, in display for checking of details or in a print out, development processing (reproduction output) is not every time delayed. In addition, such RAW files can be used in the same way as conventional still image files in general operation environments.

A set of a still image file and a RAW file is recorded in response to an instruction for capturing a single still image in the storage medium 152 or the like. When the chasing development is performed manually or automatically, in step S520, the control unit 161 determines whether the chasing development has been completed for each set of images. To perform such determination, for example, the control unit 161 refers to a flag included in the development status 405 stored in the metadata portion 402 of the still image file 400. This flag indicates whether this still image file has already been processed by the simple development unit 111. Alternatively, the control unit 161 may perform the determination by referring to the development status 415 in the RAW file 410. Alternatively, the control unit 161 may perform the determination by separately preparing a table file representing a development processing status for a series of captured still images.

In step S520, if the control unit 161 determines that the chasing development has already been performed (YES in step S520), the operation proceeds to step S502. If there is a still image on which the chasing development has not been performed yet, the operation proceeds to step S521. If a RAW file corresponding to the still image on which the chasing development has not been processed yet is buffered in the buffer unit 115 (YES in step S521), the operation proceeds to step S523. If not (NO in step S521), a corresponding RAW file is read from the storage medium 152 or the like (S522). The RAW file read from the storage medium 152 or the like is temporarily stored in the buffer unit 115.

Data in the buffer unit 115 is updated so that more-recent images captured in the still image capturing mode are preferably stored. Namely, the images are removed from the buffer unit 115 in chronological order. In this way, since the image captured most recently is always stored in the buffer unit 115, step S522 is skipped. Consequently, the image can be processed at high speed. In addition, if the chasing development is performed backward in time from the image captured most recently, since the image stored in the buffer is preferably processed, efficiency of the processing can be improved.

In step S523, the RAW decompression unit 114 decompresses the RAW file read from the buffer unit 115 or the storage medium 152 and restores the RAW image.

In step S524, the high-quality image development unit 112 develops the restored RAW image to a high quality image. Next, the high-quality image development unit 112 outputs the image to the display processing unit 122 and the still image compression unit 141 via the switch unit 121.

The high-quality image development unit 112 performs de-Bayer processing (de-mosaic processing), namely, color interpolation processing, on the RAW image, converts the RAW image into luminance and color difference (or primary color) signals, removes noise included in each signal, corrects optical distortion, and optimizes the image. Namely, the high-quality image development unit 112 performs so-called development processing. The size (the number of pixels) of the developed image generated by the high-quality image development unit 112 is that of a full-size image read by the image sensor unit 102, or a size set by the user. Thus, the quality is significantly higher than that of an image developed by the simple development that limits the number of pixels to 2 million or less.

Since the high-quality image development unit 112 performs each processing more accurately than the simple development unit 111, a developed image having higher quality can be obtained. However, a larger processing load is required. The high-quality image development unit 112 according to the present exemplary embodiment does not perform real-time development processing simultaneously with an image capturing operation but performs development processing after an image capturing operation when there is sufficient time. As a result, increase in circuit scale or power consumption can be reduced.

The image information developed by the high-quality image development unit 112 is supplied to the still image compression unit 141. In step S525, the still image compression unit 141 performs high-efficiency coding (compression of the still image) on the acquired image information and generates a high-quality still image file. The still image compression unit 141 performs compression processing by using a known technique such as JPEG.

Next, in step S526, the recording and reproducing unit 151 records the high-quality still image file in the storage medium 152 or the like. Next, the operation proceeds to step S502. If there are still images on which the chasing development has not been performed yet, similar processing can repeatedly be performed for each of the images.

The still image file recorded in step S526 has a file configuration as illustrated in the still image file 400 in FIG. 4A. The still image file 400 includes the header portion 401, the metadata portion 402, and the compressed data portion 403. The header portion 401 includes the identification code representing that this file is in a still image file format, for example. The compressed data portion 403 includes compressed data of the still image on which high-efficiency coding has been performed.

The metadata portion 402 includes the information 404 about the name of the RAW file from which this still image file has been generated. In addition, the metadata portion 402 includes the development status information 405 representing that this still image file has been developed by the high-quality image development by the high-quality image development unit 112. Further, the metadata portion 402 includes shooting metadata 406 including evaluation values and object information that are extracted from the metadata of the original RAW file and detected by the evaluation value calculation unit 105 and the recognition unit 131, and information obtained during an image capturing operation by the imaging optical unit 101 and the image sensor unit 102.

The recording and reproducing unit 151 gives the same file name as that of the previously-created still image file that is obtained after the simple development and that is recorded simultaneously with the original RAW file, to the new still image file recorded in step S526 after the high-quality image development. Namely, the recording and reproducing unit 151 overwrites the previously-created still image file with the newly-created still image file. In other words, the previously-created still image file obtained after the simple development is deleted. The recording and reproducing unit 151 updates the RAW file on which the chasing development has been performed, by writing information representing that the high-quality image development (or chasing development) has already been completed in the development status 415 in the metadata portion 412. Instead of overwrite recording, the recording and reproducing unit 151 may record the new file with a nearly similar file name. For example, the new file may be recorded as a different file whose file name has been changed only partially (for example, the extension or the character of the end portion may be changed) and the original file may be deleted. The original file may of course be saved if a sufficient storage capacity is available.

Thus, the imaging apparatus 100 according to the present exemplary embodiment performs the chasing development in a state of relatively low processing load (in an idle state) in which the imaging apparatus 100 waits for a user operation, for example, in an interval between image capturing operations, in a reproduction mode, or in a sleep state. In addition, the still image file obtained by the simple development during an image capturing operation is replaced by the still image file obtained by the high-quality image development using the RAW file. The moving image file obtained by the simple development during an image capturing operation is also replaced by the moving image file obtained by the high-quality image development using the RAW file. In this way, even if high quality image reproduction is requested, for example, in display for checking of details, or in a print out, development processing (reproduction output) is not every time delayed. In addition, such RAW files become usable in the same way as conventional still image files in general operation environments.

Next, an operation in the still image reproduction mode of the imaging apparatus 100 will be described.

FIG. 6 is a flowchart illustrating processing in the still image reproduction mode according to the present exemplary embodiment. The flowchart in FIG. 6 illustrates a procedure performed when the control unit 161 controls each processing block. More specifically, the procedure is performed when the control unit 161 expands a program stored in a ROM of the control unit 161 to a RAM and executes the program.

In FIG. 6, in step S600, processing in the still image reproduction mode is started. Next, in step S601, the control unit 161 determines whether the processing load of the imaging apparatus 100 is low. If the control unit 161 determines that the processing load is low (YES in step S601), the operation proceeds to step S610 and the imaging apparatus 100 shifts to an idle state with a frequency according to the load state. If not (NO in step S601), the operation proceeds to step S602. For example, when the imaging apparatus 100 is waiting for a user operation such as a reproduction instruction, the processing load is low. Thus, in such a case, the operation proceeds to step S610. If reproduction of a still image has already been instructed or a still image is being reproduced by a user operation, the operation proceeds to step S602.

In step S602, the control unit 161 determines whether the user has given the imaging apparatus 100 an instruction for enlarging display of a still image to be reproduced. If so (YES in step S602), the operation proceeds to step S603. If not (NO in step S602), the operation proceeds to step S620.

FIG. 7 illustrates display modes including an enlarged display mode. FIGS. 7A to 7C illustrate display processing in the still image reproduction mode according to the present exemplary embodiment.

A display 700 in FIG. 7A is an example in which the display unit 123 displays six reduced images 701. A display 710 in FIG. 7B is an example in which the display unit 123 displays the whole of a certain image 711. This display state is considered as normal display. A display 720 in FIG. 7C is an example in which the display unit 123 displays an image 721 which is an enlarged area of a certain image. For example, generally, a part of an object image is enlarged as illustrated in the display example 720 immediately after an image capturing operation to determine whether focusing has been appropriately performed.

If enlarged display is performed as illustrated in the display example 720 (YES in step S602), the operation in FIG. 6 proceeds from step S602 to step S603. If reduced display is performed as illustrated in the display example 700 (NO in step S602), the operation proceeds from step S602 to step S620. Regarding the display example 710, if the number of pixels displayed by the display unit 123 is the number of pixels of a still image file obtained by the simple development (2 million pixels or less in the above example), the image can be displayed at the same or a reduced magnification. Thus, the operation proceeds from step S602 to step S620.

In step S620, the recording and reproducing unit 151 reads the reproduction target still image file from the storage medium 152 or the like. Next, in step S621, the still image decompression unit 143 decodes and decompresses the still image file. Next, in step S608, the display processing unit 122 outputs the display image to the display unit 123 in a format illustrated in FIGS. 7A-7C.

If the number of pixels of the still image file obtained by the simple development (2 million pixels or less in the above example) is sufficient to display an image, the still image file developed by the simple development unit 111 can be displayed with sufficient image quality. Of course, if the still image file has been developed by the high-quality image development unit 112, the still image file has sufficient image quality for display.

In contrast, if the enlarged display is performed, the number of pixels of a still image file obtained by the simple development (2 million pixels or less in the above example) may not be sufficient to display an image. Namely, if the still image file developed by the simple development is used for display, sharpness is decreased.

Thus, if enlarged display is presented, in step S603, the control unit 161 determines whether the still image file of the reproduction and display target image has been developed by the high-quality image development unit 112. In order to make such a determination, for example, the control unit 161 refers to a flag included in the development status 405 stored in the metadata portion 402 of the still image file 400. This flag indicates whether this still image file has already been processed by the simple development unit 111. Alternatively, the control unit 161 may make the determination by referring to the development status 415 in the RAW file 410. Alternatively, the control unit 161 may make the determination by separately preparing a table file representing a development processing status for a series of captured still images.

In step S603, if the control unit 161 determines that the high-quality image development has been performed (YES in step S603), the control unit 161 determines that the still image file is a high-quality still image file that can be displayed with sufficient image quality even if enlarged. Thus, in such a case (YES in step S603), the operation proceeds to step S620 and the recording and reproducing unit 151 reads the corresponding high-quality still image file from the storage medium 152 or the like, and reproduces and displays the still image file. As described above, if the still image file has already been developed by the high-quality image development unit 112, the still image file can be displayed with high image quality through processing after step S620.

In step S603, if the control unit 161 does not determine that the high-quality image development has been performed (NO in step S603), the control unit 161 determines that the still image file has been developed by the simple development unit 111. Thus, in such a case (NO in step S603), the operation proceeds to step S604 and the imaging apparatus 100 performs high-quality image development (the above chasing development).

Next, in step S604, if the RAW file corresponding to the reproduction target still image is buffered in the buffer unit 115 (YES in S604), the operation proceeds to step S606. If not (NO in S604), the operation proceeds to step S605 and the corresponding RAW file is read from the storage medium 152 or the like. The RAW file read from the storage medium 152 or the like is temporarily stored in the buffer unit 115.

Data in the buffer unit 115 is updated so that more-recent images captured in the still image capturing mode are preferably stored. Namely, the images are removed from the buffer unit 115 in chronological order. In this way, since the image captured most recently is always stored in the buffer unit 115, step S605 is skipped. Consequently, the image can be displayed promptly.

Next, in step S606, the RAW decompression unit 114 decodes and decompresses the RAW file read from the buffer unit 115 or the storage medium 152 and restores the RAW image.

Next, in step S607, the restored RAW image is developed by the high-quality image development unit 112 to a high quality image and the developed image is output to the display processing unit 122 via the switch unit 121. Next, in step S608, the display processing unit 122 outputs an enlarged image as illustrated in FIG. 7C to the display unit 123.

The high-quality image development unit 112 performs de-Bayer processing (de-mosaic processing), namely, color interpolation processing, on the RAW image, converts the RAW image into luminance and color difference (or primary color) signals, removes noise included in each signal, corrects optical distortion, and optimizes the image. Namely, the high-quality image development unit 112 performs so-called development processing. The size (the number of pixels) of the developed image generated by the high-quality image development unit 112 is that of a full-size image read by the image sensor unit 102, or a size set by the user. Thus, the quality is significantly higher than that of an image developed by the simple development that limits the number of pixels to 2 million or less. Thus, the still image developed by the high-quality image development unit 112 can be displayed with sufficient image quality in response to an enlarged display request.

After the display in step S608 is stopped, the operation returns to step S601. If the control unit 161 determines that the processing load is low (YES in step S601), the operation proceeds to step S610 and the imaging apparatus 100 shifts to an idle state. In such a case, the image is processed in accordance with the above flowchart in FIG. 5.

It is assumed that the high-quality image development after step S604 in FIG. 6 is performed when the chasing development has not yet been performed, for example, immediately after an image capturing operation, as described above. In the present exemplary embodiment, the chasing development on a still image is gradually completed in a relatively low processing load state in which the imaging apparatus 100 waits for a user operation, for example, in an interval between image capturing operations, in a reproduction mode, or in a sleep state, and the still image file developed by the simple development is naturally replaced by the still image file developed by the high-quality image development. The more images are replaced, the less high-quality image development operation after step S604 is performed. Namely, since a high quality image can always be output promptly, operability can be improved further.

As described above, if the RAW file is stored in the buffer unit 115, since step S605 can be skipped, the image can be displayed promptly. Thus, in the case of the display examples 700 and 710 in FIG. 7, to prepare for an enlarged display instruction, RAW files corresponding to the images 701 and 711 may be previously read from a storage medium and moved to the buffer unit 115 so that as many RAW files as possible are stored in the buffer unit 115. By causing the recording and reproducing unit 151 to read a corresponding RAW file from the storage medium 152 or the like and causing the buffer unit 115 to buffer the corresponding RAW file prior to an instruction for enlarged display, the image can be displayed more promptly in response to an instruction for the enlarged display as illustrated by the display example 720.

Next, an operation in the moving image capturing mode of the imaging apparatus 100 will be described.

FIG. 8 is a flowchart illustrating processing in the moving image capturing mode according to the present exemplary embodiment. The flowchart in FIG. 8 illustrates a procedure performed when the control unit 161 controls each processing block. More specifically, the procedure is performed when the control unit 161 expands a program stored in a ROM of the control unit 161 to a RAM and executes the program.

In FIG. 8, in step S800, processing in the moving image capture mode is started. Next, in step S801, the control unit 161 determines whether the processing load of the imaging apparatus 100 is low. If the control unit 161 determines that the processing load is low (YES in step S801), the operation proceeds to step S820 and the imaging apparatus 100 shifts to an idle state with a frequency according to the load state. If not (NO in step S801), the operation proceeds to step S802. For example, the processing load is high when a moving image including many pixels whose horizontal resolution is on the order of 4,000 (4K) pixels is set or when a moving image with a high frame rate such as 120 frames (120P) per second is set. In such a case, the operation does not proceed to step S820 but always proceeds to step S802. If the imaging apparatus 100 captures a moving image whose pixel number is lower than a predetermined value or whose frame rate is lower than a predetermined rate, for example, half of the operations proceeds to step S820 between a first frame and a second frame of a moving image.

In step S802, the camera control unit 104 controls operations of the imaging optical unit 101 and the image sensor unit 102 so that a moving image is captured under suitable conditions. For example, a lens included in the imaging optical unit 101 is moved in accordance with a user instruction for zooming or focusing. In addition, the area read by the image sensor unit 102 is set in accordance with an instruction about the number of pixels. Further, control operations such as focus adjustment and tracking of a certain object are performed based on evaluation value information and object information supplied from the evaluation value calculation unit 105 and the recognition unit 131 as described below.

In step S803, the sensor signal processing unit 103 performs signal processing for pixel restoration on the converted electrical signal obtained by the image sensor unit 102. Namely, by using values of neighboring pixels, the sensor signal processing unit 103 interpolates values of missing pixels and low-reliability pixels. In addition, the sensor signal processing unit 103 subtracts predetermined offset values. In the present exemplary embodiment, the image information output from the sensor signal processing unit 103 after step S803 is referred to as a RAW image (in particular, a RAW moving image), which signifies a law (undeveloped) moving image.

Next, in step S804, the simple development unit 111 develops the RAW image. In this step S804, the control unit 161 changes over the switch unit 121 in the development unit 110 to select output of image information that has been developed by the simple development unit 111.

The simple development unit 111 performs de-Bayer processing (de-mosaic processing) on the RAW moving image that forms the frames of a moving image, converts the RAW moving image into luminance and color difference (or primary color) signals, removes noise included in each signal, corrects optical distortion, and optimizes the image. Namely, the simple development unit 111 performs so-called development processing. Next, the development processing (simple development) performed on the moving image by the simple development unit 111 will be described. For example, the simple development unit 111 limits the developed image size to 2 million pixels or less of a high definition (HD) size. Alternatively, the simple development unit 111 only performs limited noise removal or optical distortion correction. Alternatively, the simple development unit 111 omits performing such processing. In this way, the simple development unit 111 realizes quicker and simpler development. Since the simple development unit 111 performs processing on an image of reduced size or performs limited development processing, the imaging apparatus 100 can capture a moving image of a HD size or the like at high speed with a smaller circuit scale and less power consumption.

The image information developed by the simple development unit 111 is supplied to the evaluation value calculation unit 105. In step S805, the evaluation value calculation unit 105 calculates evaluation values such as the focus state and the exposure state, based on a luminance value, a contrast value, and the like included in the image information. The evaluation value calculation unit 105 may acquire the RAW moving image before the development processing is performed and calculate evaluation values from the RAW moving image in a similar way.

In addition, the image information developed by the simple development unit 111 is also supplied to the recognition unit 131. In step S806, the recognition unit 131 detects an object (a face, for example) from the image information and recognizes object information. For example, the recognition unit 131 detects presence or absence of a face in the image information. If a face exists, the recognition unit 131 detects the position of the face, authenticates a certain person, and outputs the result as information.

In addition, the image information developed by the simple development unit 111 is also supplied to the display processing unit 122. In step S807, the display processing unit 122 forms a display image from the acquired image information and outputs the display image to the display unit 123 or an external display device to display the image. In the moving image capturing mode, the display image presented by the display unit 123 is used for checking the display so that the user can appropriately frame an object. More specifically, as a usage unique to capturing of a moving image, not only before the recording of a captured moving image is started (in a standby state) but also while the recording of a moving image is being performed (during REC), the display image is used for live view display so that the user can appropriately frame an object. The display image may be transmitted from the display processing unit 122 to another display device such as an external television via the video output terminal 124 so that the display device can present the display image. In addition, by using the evaluation value information and object information supplied from the evaluation value calculation unit 105 and the recognition unit 131, the display processing unit 122 can display markings on focus areas of the display image and frames on the recognized face positions, for example.

In step S808, the control unit 161 determines whether the captured moving image is being recorded (during REC) in response to a recording start instruction from the user. If so (YES in step S808), the operation proceeds to step S810. If not (NO in step S808), namely, if the imaging apparatus 100 is in a standby state (NO in step S808), the operation returns to step S801, and the image capturing operation and live view display before the start of recording of a moving image are repeated.

In step S810, of the moving images captured in step S808, the moving image compression unit 142 compresses the moving image recorded from the start of the recording to the end of the recording frame by frame. In addition, simultaneously with capturing of a moving image, audio information input via a microphone (not illustrated) is acquired. However, description of the audio information by using a drawing will be omitted. The moving image compression unit 142 also compresses the audio information corresponding to the moving image.

The moving image compression unit 142 performs high-efficiency coding (compression of the moving image) on the acquired moving image information on which the simple development has been performed, and the audio information to generate a moving image file. By using a known moving image compression technique such as MPEG-2, H.264, or H.265, the moving image compression unit 142 performs the compression processing.

In step S811, the recording and reproducing unit 151 records the moving image file in the storage medium 152.

The sensor signal processing unit 103 supplies the RAW moving image of the period corresponding to the period of the moving image recorded in step S808, to the RAW compression unit 113. In step S812, the RAW compression unit 113 performs high-efficiency coding (RAW compression) on the RAW moving image representing the same scene as that represented by the recorded moving image and converts the RAW moving image into a RAW file (RAW moving image file). The RAW moving image file is stored in the buffer unit 115. The RAW compression unit 113 performs the high-efficiency coding by using a known technique such as wavelet transform or differential coding, which may be lossy coding or lossless coding. Alternatively, the RAW compression performed by the RAW compression unit 113 may be omitted. Namely, the RAW compression unit 113 may directly output the RAW moving image without compressing the RAW moving image. Regardless of whether the RAW moving image is compressed or not, in the present exemplary embodiment, a RAW moving image file can be created that is not significantly deteriorated from the image information supplied from the sensor signal processing unit 103 and that can be restored as a high-quality image file.

In step S813, the recording and reproducing unit 151 records the RAW moving image file in the storage medium 152. Next, the operation proceeds to step S801. Alternatively, in steps S811 and S813, the recording and reproducing unit 151 may transmit the moving image file and/or the RAW moving image file to an external storage via the communication unit 153 and the communication terminal 154 so that the moving image file and/or the RAW moving image file can be recorded in the external storage.

A flow of processing in the moving image capturing mode according to the present exemplary embodiment has thus been described.

Next, configurations of a moving image file and a RAW moving image file according to the present exemplary embodiment will be described. FIGS. 9A and 9B illustrate configurations of a moving image file and a RAW moving image file.

A moving image file 900 illustrated in FIG. 9A is recorded by the recording and reproducing unit 151 in a predetermined recording area of the storage medium 152, for example. The moving image file 900 includes a header portion 901, a metadata portion 902, and a compressed data portion 903. The header portion 901 includes an identification code representing that this file is in a moving image file format. The compressed data portion 903 includes compressed data of the audio and the moving image on which high-efficiency coding has been performed.

The metadata portion 902 includes information 904 about the name of the RAW moving image file generated simultaneously with this moving image file. In addition, the metadata portion 902 includes development status information 905 representing that this moving image file has been developed by the simple development unit 111 performing the simple development. Further, the metadata portion 902 includes shooting metadata 906 including evaluation values and object information detected by the evaluation value calculation unit 105 and the recognition unit 131, and information obtained during an image capturing operation performed by the imaging optical unit 101 and the image sensor unit 102 (for example, lens type identification information and sensor type identification information). Furthermore, while not illustrated, the metadata portion 902 may include an identification code of a storage medium in which the simultaneously-generated RAW moving image file is recorded, and path information about a folder in which the image file is recorded.

A RAW moving image file 910 illustrated in FIG. 9B is recorded by the recording and reproducing unit 151 in a predetermined recording area of the storage medium 152, for example. The RAW moving image file 910 includes a header portion 911, a metadata portion 912, and a compressed data portion 913. The header portion 911 includes an identification code representing that this file is in a RAW moving image file format. The compressed data portion 913 includes RAW compressed data of the moving image on which high-efficiency coding has been performed (or may include RAW image data of the moving image that has not been compressed).

The metadata portion 912 includes information 914 about the name of the moving image file generated simultaneously with this RAW moving image file. Further, the metadata portion 912 includes development status information 915 representing that this moving image file has been developed by the simple development unit 111 performing the simple development. In addition, the metadata portion 912 includes shooting metadata 916 including evaluation values and object information detected by the evaluation value calculation unit 105 and the recognition unit 131, and information obtained during an image capturing operation by the imaging optical unit 101 and the image sensor unit 102 (for example, lens type identification information and sensor type identification information). If data in the shooting metadata 916 is a common one with that in the shooting metadata 906, the same data is used. Further, while not illustrated, the metadata portion 912 may include an identification code of a storage medium in which the simultaneously-generated moving image file is recorded, and path information about a folder in which the moving image file is recorded. Alternatively, the simultaneously-generated moving image file may entirely be formed as metadata and stored in the metadata portion 912. Alternatively, part (a head frame, for example) of the simultaneously generated moving image file may be extracted and formed as metadata and stored in the metadata portion 912.

The above configurations of various files according to the present exemplary embodiment are only examples. Other configurations compatible with standards such as DCF, Advanced Video Codec High Definition (AVCHD), or Material eXchange Format (MXF) may be used.

The simple development unit 111 in the imaging apparatus 100 according to the present exemplary embodiment displays an image captured in the moving image capture mode (live view display) and performs development processing on a moving image file generated during an image capturing operation, as described above. The simple development unit 111 performs the processing in a lower amount than that required by the high-quality image development unit 112, for example, by limiting the developed image size to 2 million pixels or less, by only performing limited noise removal or optical distortion correction, or by omitting such processing. In this way, the simple development unit 111 can develop, for example, a moving image of a HD size with a smaller circuit scale and less power consumption. Further, as described above, in addition to a moving image file, the imaging apparatus 100 according to the present exemplary embodiment generates a RAW moving image file corresponding to the recording period of the moving image. The RAW moving image file is not significantly deteriorated from the image information supplied from the sensor signal processing unit 103, however, no development processing is required for generating this file. Thus, even if the image pixel number is increased to 4K, or 8K (the horizontal resolution is on the order of 8,000 pixels) or the frame rate is increased to 120 frames per second (120P), the RAW moving image file can be recorded with a smaller circuit scale and less power consumption.

Next, an operation of the imaging apparatus 100 in the moving image reproduction mode will be described.

FIG. 10 is a flowchart illustrating processing in the moving image reproduction mode according to the present exemplary embodiment. The flowchart in FIG. 10 illustrates a procedure performed when the control unit 161 controls each processing block. More specifically, the procedure is performed when the control unit 161 expands a program stored in a ROM of the control unit 161 to a RAM and executes the program.

In FIG. 10, in step S1000, processing in the moving image reproduction mode is started. Next, in step S1001, the control unit 161 determines whether the processing load of the imaging apparatus 100 is low. If the control unit 161 determines that the processing load is low (YES in step S1001), the operation proceeds to step S1010 and the imaging apparatus 100 shifts to an idle state with a frequency according to the loading state. If not (NO in step S1001), the operation proceeds to step S1002. For example, when the imaging apparatus 100 is waiting for a user operation such as a reproduction instruction, the processing load is low. Thus, in such a case, the operation proceeds to step S1010. If reproduction of a moving image has already been instructed and a moving image is being reproduced by a user operation, the operation proceeds to step S1002.

In step S1002, the control unit 161 determines whether the user has given an instruction for temporarily stopping (pause) of reproduction of the moving image. If not (NO in step S1002), the operation proceeds to step S1003 to continue reproduction of the moving image.

In step S1003, the recording and reproducing unit 151 reads a moving image file to be reproduced, from the storage medium. 152 or the like. Next, in step S1004, the moving image decompression unit 144 decodes and decompresses frames of the moving image file one by one. Next, in step S1005, the display processing unit 122 outputs the reproduced display image of the moving image to the display unit 123.

In step S1002, if the control unit 161 determines that the user has given an instruction for temporarily stopping (pause) of reproduction of the moving image (YES in step S1002), the control unit 161 temporarily stops reproduction and display of the moving image and the operation proceeds to step S1020 to display as a still image the frame corresponding to the position at which the pause instruction has been given. In the pause state, since the still image is displayed, the user can view quality of the details of the image more easily than that of the moving image in motion. In addition, it is more likely that an instruction for enlarged display during a pause operation is received. Therefore, to display an image with higher image quality than a moving image file developed by the simple development, in step S1020, the recording and reproducing unit 151 reproduces the RAW image frame corresponding to the frame being displayed in the pause operation, of the RAW moving image file corresponding to the moving image file being reproduced. In this step S1020, if the reproduction-target RAW moving image file is buffered in the buffer unit 115, the recording and reproducing unit 151 reads the RAW moving image file from the buffer unit 115. If not, the recording and reproducing unit 151 reads the RAW moving image file from the storage medium 152 or the like. The RAW moving image file read from the storage medium 152 or the like is temporarily stored in the buffer unit 115.

Next, in step S1021, the RAW decompression unit 114 decodes and decompresses the RAW moving image file read from the buffer unit 115, the storage medium 152, or the like, to restore the RAW moving image. In step S1022, the high-quality image development unit 112 develops the restored RAW moving image to a high-quality moving image.

The imaging apparatus 100 can capture as a new still image file the high-quality still image that has been developed as a high quality image from the RAW moving image file and that corresponds to the frame displayed in the pause operation. In step S1023, the control unit 161 determines whether the user has given an instruction for capturing as a still image the displayed image in the pause operation. If not (NO in step S1023), the still image developed as a high quality image from the RAW moving image file is supplied to the display processing unit 122. Next, in step S1005, the display processing unit 122 outputs the developed display image of the high-quality still image, to the display unit 123. In this way, the image displayed when the moving image file is temporarily stopped is replaced by the display image of the still image developed as a high quality image from the RAW image.

In step S1023, if the control unit 161 determines that the user has given an instruction for capturing a still image (YES in step S1023), the image information developed by the high-quality image development unit 112 in step S1022 is supplied to the still image compression unit 141. In step S1024, the still image compression unit 141 performs high-efficiency coding (compression of the still image) on the image information acquired by the capturing and generates a high-quality still image file. The still image compression unit 141 may perform compression processing by using a known technique such as JPEG.

After the recording and reproducing unit 151 records the high-quality still image file in the storage medium 152 or the like in step S1025, the operation proceeds to step S1005. The still image developed as a high quality image from the RAW moving image file is supplied to the display processing unit 122. Next, in step S1005, the display processing unit 122 outputs the display image of the still image developed as a high quality image to the display unit 123. In this way, the image displayed when the moving image file is temporarily stopped is replaced by the display image of the still image developed as a high quality image from the RAW image.

The high-quality still image file generated by the still image compression unit 141 in step S1024 has a configuration as illustrated by the configuration of the still image file 400 in FIG. 4A. The metadata portion 402 stores the name of the RAW moving image file from which the high-quality still image file has been generated, as the information 404 about the RAW file. Further, information about the time at which the frame has been captured as the still image is stored as the shooting metadata 406. The information can indicate the position of the frame in the RAW moving image file. Alternatively, the frame in the RAW moving image file may be extracted as a still image, and the RAW file 410 of the new still image serving as a counterpart may be created at this point. Regarding generation of the RAW file of the still image, the still image file and the RAW file are generated based on the method as described with steps S310 to S313 in the above still image capturing mode.

The display in step S1005 is performed per frame. During reproduction of the moving image, the operation returns to step S1001 to display the next frame. In step S1001, if the control unit 161 determines that the processing load is low (YES in step S1001), and the imaging apparatus 100 shifts to an idle state S1010, the operation is processed in accordance with the above flowchart in FIG. 5.

Thus, to reproduce a moving image easily and without delay, the imaging apparatus 100 according to the present exemplary embodiment uses a moving image file recorded during an image capturing operation. In a pause state, the imaging apparatus 100 can replace the moving image with a still image developed as a high quality image from the RAW file of the moving image and display the still image. In addition, this high-quality still image can easily be captured as a still image file.

Further, it is assumed that the high-quality image development after step S1020 in FIG. 10 is performed when chasing development has not yet been performed, at timing immediately after an image capturing operation. In the present exemplary embodiment, the imaging apparatus 100 gradually completes the chasing development on a moving image in a relatively low processing load state in which the imaging apparatus 100 waits for a user operation, for example, in an interval between image capturing operations, in a reproduction mode, or in a sleep state. The moving image file generated by the simple development is naturally replaced with the moving image file generated by the high-quality image development. The more images are replaced, the less high-quality image development operation after step S1020 is performed. Namely, since a high-quality image can always be output promptly, operability can be improved further.

While the present exemplary embodiment has thus been described, the present invention is not limited thereto. According to the present invention, within the technical concept of the present invention, various changes are applicable as needed depending on related circuit modes.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD) (trademark), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-053244 filed Mar. 15, 2013 and No. 2013-053245 filed Mar. 15, 2013, which are hereby incorporated by reference herein in their entirety.

The invention claimed is:

1. An image processing apparatus, comprising:
a central processing unit (CPU); and
a memory having stored thereon instructions that when executed by the CPU, cause the CPU to perform control to cause the image processing apparatus to:
obtain a RAW image generated from a captured image;
perform first development processing of developing the RAW image to obtain a developed image;
store, into a storage medium, the RAW image as a RAW image file and the developed image obtained by the first development processing as an image file;
read the RAW image file stored in the storage medium and perform second development processing of developing the RAW image to obtain a developed image having higher image quality than the developed image obtained by the first development processing;
output the developed image obtained by the first or second development processing as a display image;
recieve an instruction for enlarging a partial area of the display image; and
perform a switching operation to output the developed image obtained by the second development processing in a case where the instruction for enlarging the partial area is given in a state in which the developed image obtained by the first development processing is displayed as the display image.

2. The image processing apparatus according to claim 1, wherein, as metadata, status information representing whether the first or second development processing has developed the RAW image is stored.

3. The image processing apparatus according to claim 1, wherein the first development processing develops the RAW image simultaneously with an image capturing operation and wherein the second development processing develops the RAW image after the image capturing operation.

4. The image processing apparatus according to claim 1, wherein, when a processing load of the image processing apparatus is light, the second development processing obtains the developed image having higher image quality and stores the developed image obtained by the second image processing as the image file in the storage medium.

5. The image processing apparatus according to claim 4, wherein in the case where the obtained developed image having higher quality is not stored in the storage medium as an image file, cause the second development processing to develop the RAW image file stored in the storage medium to obtain a resultant image.

6. The image processing apparatus according to claim 4, wherein the developed image obtained by the second development processing is stored into the storage medium as a new image file.

7. The image processing apparatus according to claim 6, wherein, upon storing of the new image file into the storage medium, the image file of the developed image obtained by the first development processing and stored in the storage medium is deleted.

8. The image processing apparatus according to claim 7, wherein a file name of the new image file is set to be the same as, or relevant to, a file name of the image file of the developed image obtained by performing the first development processing.

9. An image processing method, comprising:
an imaging capturing operation of capturing an object image and generating a RAW image;
a first development operation of developing the RAW image to obtain a developed image;
a storage operation of storing into a storage medium the RAW image as a RAW image file and the developed image obtained by the first development operation as an image file;
a second development operation of reading the RAW image file stored in the storage medium and performing second development operation of developing the RAW image to obtain a developed image having higher image quality than that of the developed image obtained in the first development operation;
a display process of outputting the developed image obtained in the first or second development operation as a display image;
an operation of giving an instruction for enlarging a partial area of the display image; and
a switching control operation for switching operation to output the developed image obtained by the second development operation in a case where the instruction for enlarging the partial area is given by the operation in a state in which the developed image obtained by the first development operation is displayed as the display image by the display process.

10. The image processing method according to claim 9, wherein, as metadata, status information representing whether the first or second development operation has developed the RAW image is stored in the storage operation.

11. The image processing method according to claim 9, wherein, in the first development operation, development processing of the RAW image is performed simultaneously with the image capturing operation and wherein, in the second development operation, the second development operation develops the RAW image after the image capturing operation.

12. The image processing method according to claim 9, wherein, when a processing load of the image processing apparatus is light, the second development operation performs the second development process on the RAW image stored as the RAW image file in the storage medium, and the storage operation stores the developed image obtained by performing the second development processing as the image file into the storage medium.

13. The image processing method according to claim 12, wherein, when the developed image obtained by performing the second development operation is outputted, the control operation outputs the image read out of the storage medium in a case where the developed image obtained by performing the second development operation is stored in the storage medium, and the control operation reads the information representing the RAW image out of the storage medium and causes the second development operation to perform the second development processing on the information representing the RAW image to output a resultant image in a case where the developed image obtained by performing the second development operation is not stored in the storage medium.

14. The image processing method according to claim 12, wherein the storage operation stores the developed image obtained by performing the second development operation into the storage medium as a new image file.

15. The image processing method according to claim 14, wherein, upon storing of the new image file into the storage medium, the storage operation deletes the image file of the developed image obtained by performing the first development operation and stored in the storage medium.

16. The image processing method according to claim 15, wherein the storage operation sets a file name of the new image file to be the same as, or relevant to, a file name of the image file of the developed image obtained by performing the first development operation.

17. A non-transitory computer-readable storage medium for storing a program to cause a computer to execute the method according to claim 9.

* * * * *